(12) United States Patent
Gopal et al.

(10) Patent No.: US 12,284,720 B2
(45) Date of Patent: Apr. 22, 2025

(54) TECHNIQUES FOR MANAGING POWER AMPLIFIER RELIABILITY FOR MULTI-SIM ANTENNA SWITCHING CONCURRENCY

(71) Applicant: QUALCOMM Incorporated, San Diego, CA (US)

(72) Inventors: Thawatt Gopal, San Diego, CA (US); Sridhar Bandaru, Westminster, CO (US); Vishal Mahajan, Dublin, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/644,190

(22) Filed: Dec. 14, 2021

(65) Prior Publication Data

US 2022/0232367 A1 Jul. 21, 2022

Related U.S. Application Data

(60) Provisional application No. 63/199,675, filed on Jan. 15, 2021.

(51) Int. Cl.
*H04W 8/18* (2009.01)
(52) U.S. Cl.
CPC ..................................... *H04W 8/18* (2013.01)
(58) Field of Classification Search
CPC ...................................................... H04W 8/18
(Continued)

(56) References Cited

U.S. PATENT DOCUMENTS 8,526,946 B2 9/2013 Pattaswamy et al.
9,137,687 B2 9/2015 Gottimukkala et al.
(Continued)

FOREIGN PATENT DOCUMENTS

CN 110692263 A 1/2020
CN 113423106 A 9/2021
(Continued)

OTHER PUBLICATIONS

International Search Report and Written Opinion—PCT/US2021/072939—ISA/EPO—dated Apr. 12, 2022.
(Continued)

*Primary Examiner* — Ahmad F. Matar
*Assistant Examiner* — Jirapon Tulop
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may detect a first communication, associated with a first subscriber identity module (SIM) operating in a connected mode, that is at least partially overlapping in a time domain with a second communication associated with a second SIM operating in an idle mode. The UE may detect that a transmit chain associated with the first SIM and a receive chain associated with the second SIM are sharing an antenna switch. The UE may perform a preventive action based at least in part on the first communication associated with the first SIM overlapping in the time domain with the second communication associated with the second SIM while the transmit chain associated with the first SIM and the receive chain associated with the second SIM are sharing the antenna switch. Numerous other aspects are described.

30 Claims, 13 Drawing Sheets

(58) Field of Classification Search
USPC .......................................................... 455/418
See application file for complete search history.

(56) References Cited

U.S. PATENT DOCUMENTS

| | | | |
|---|---|---|---|
| 10,187,781 | B2 | 1/2019 | Kumar et al. |
| 10,980,001 | B2 | 4/2021 | Huang et al. |
| 11,558,733 | B2 | 1/2023 | Baskar et al. |
| 2012/0264473 | A1 | 10/2012 | Mujtaba et al. |
| 2013/0316718 | A1 | 11/2013 | Hsu et al. |
| 2014/0200046 | A1 | 7/2014 | Sikri et al. |
| 2014/0213210 | A1 | 7/2014 | Li et al. |
| 2014/0228039 | A1* | 8/2014 | Zhao .................. H04B 1/3816 455/458 |
| 2014/0370892 | A1 | 12/2014 | Gottimukkala et al. |
| 2015/0011236 | A1 | 1/2015 | Kazmi et al. |
| 2015/0071088 | A1 | 3/2015 | Gottimukkala et al. |
| 2015/0295692 | A1 | 10/2015 | Gowda et al. |
| 2015/0304963 | A1 | 10/2015 | Mitra et al. |
| 2015/0381291 | A1 | 12/2015 | Mahajan et al. |
| 2016/0049976 | A1 | 2/2016 | Krishnamoorthi et al. |
| 2016/0099684 | A1* | 4/2016 | Qiu ..................... H03F 3/195 330/307 |
| 2016/0134317 | A1 | 5/2016 | Hu et al. |
| 2016/0278128 | A1 | 9/2016 | Krishnamurthy |
| 2016/0330653 | A1 | 11/2016 | Yang et al. |
| 2017/0026876 | A1 | 1/2017 | Yang et al. |
| 2017/0180550 | A1 | 6/2017 | Geo et al. |
| 2017/0208494 | A1 | 7/2017 | Moon et al. |
| 2017/0223313 | A1 | 8/2017 | Chong et al. |
| 2017/0223589 | A1 | 8/2017 | Lee et al. |
| 2018/0084601 | A1 | 3/2018 | Dhanapal et al. |
| 2018/0176887 | A1 | 6/2018 | Strobl |
| 2018/0184309 | A1* | 6/2018 | Bhardwaj ........... H04W 72/542 |
| 2018/0234878 | A1 | 8/2018 | Anand et al. |
| 2018/0234916 | A1 | 8/2018 | Song et al. |
| 2018/0242192 | A1 | 8/2018 | Zhao et al. |
| 2018/0270649 | A1 | 9/2018 | Tsai et al. |
| 2018/0338284 | A1* | 11/2018 | Maheshwari ......... H04W 72/53 |
| 2019/0199413 | A1 | 6/2019 | Sundararajan et al. |
| 2019/0364492 | A1 | 11/2019 | Azizi et al. |
| 2020/0336891 | A1 | 10/2020 | Guo et al. |
| 2021/0029773 | A1 | 1/2021 | Majumder et al. |
| 2021/0266058 | A1 | 8/2021 | Yu et al. |
| 2021/0400599 | A1 | 12/2021 | Gopal |
| 2022/0007171 | A1 | 1/2022 | Wang |
| 2022/0103214 | A1 | 3/2022 | Gopal et al. |
| 2022/0150788 | A1 | 5/2022 | Jiang et al. |
| 2022/0295543 | A1 | 9/2022 | Shahidi et al. |
| 2023/0078016 | A1 | 3/2023 | Gopal et al. |
| 2023/0370833 | A1 | 11/2023 | Zhang |
| 2024/0089918 | A1 | 3/2024 | Shrivastava et al. |

FOREIGN PATENT DOCUMENTS

| | | |
|---|---|---|
| EP | 2302973 A1 | 3/2011 |
| EP | 2515593 A2 | 10/2012 |
| WO | 2015160457 A1 | 10/2015 |
| WO | WO-2016122773 A1 | 8/2016 |
| WO | 2020125839 A1 | 6/2020 |
| WO | 2020247043 A1 | 12/2020 |
| WO | 2021253966 A1 | 12/2021 |

OTHER PUBLICATIONS

Jung G., et al., "Performance Improvements of Universal Mobile Telecommunications System Enhanced Uplink Using Mitigation Scheme in Single Tx and Dual Rx Dual-SIM Dual-Active Devices", IET, Electronics Letters, vol. 51, No. 25, pp. 2160-2162, Dec. 10, 2015, 2 pages.

* cited by examiner

TECHNIQUES FOR MANAGING POWER AMPLIFIER RELIABILITY FOR MULTI-SIM ANTENNA SWITCHING CONCURRENCY

CROSS-REFERENCE TO RELATED APPLICATION

This Patent Application claims priority to U.S. Provisional Patent Application No. 63/199,675, filed on Jan. 15, 2021, entitled "TECHNIQUES FOR MANAGING POWER AMPLIFIER RELIABILITY FOR MULTI-SIM ANTENNA SWITCHING CONCURRENCY," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for managing power amplifier reliability for multiple subscriber identity module (multi-SIM) antenna switching concurrency.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes detecting a first communication, associated with a first subscriber identity module (SIM) operating in a connected mode, that is at least partially overlapping in a time domain with a second communication associated with a second SIM operating in an idle mode; detecting that a transmit chain associated with the first SIM and a receive chain associated with the second SIM are sharing an antenna switch; and performing a preventive action based at least in part on the first communication associated with the first SIM overlapping in the time domain with the second communication associated with the second SIM while the transmit chain associated with the first SIM and the receive chain associated with the second SIM are sharing the antenna switch.

In some aspects, the second communication associated with the second SIM includes activity to prepare or program one or more components in the receive chain associated with the second SIM to demodulate or decode a received signal.

In some aspects, the preventive action is to limit an allowable output power from the transmit chain associated with the first SIM to a maximum value that satisfies a ruggedness or reliability parameter associated with a power amplifier in the transmit chain associated with the first SIM.

In some aspects, the maximum value for the allowable output power is a minimum of the ruggedness or reliability parameter associated with the power amplifier and one or more additional limits on the allowable output power from the transmit chain associated with the first SIM.

In some aspects, the preventive action is to stop or suspend transmission activity associated with the first SIM while the first communication associated with the first SIM is overlapping in the time domain with the second communication associated with the second SIM.

In some aspects, the method includes resuming the transmission activity associated with the first SIM based at least in part on the first communication associated with the first SIM ceasing to overlap in the time domain with the second communication associated with the second SIM.

In some aspects, the preventive action is to deny the second communication associated with the second SIM that overlaps in the time domain with the first communication associated with the first SIM.

In some aspects, the method includes determining a first priority for the first communication associated with the first SIM and a second priority for the second communication associated with the second SIM; and selecting the preventive action based at least in part on the first priority and the second priority.

In some aspects, the preventive action is to limit an allowable output power from the transmit chain associated with the first SIM or to stop or suspend transmission activity associated with the first SIM based at least in part on the second communication associated with the second SIM having a higher priority than the first communication associated with the first SIM.

In some aspects, the preventive action is to deny the second communication associated with the second SIM that overlaps in the time domain with the first communication associated with the first SIM based at least in part on the first communication associated with the first SIM having a higher priority than the second communication associated with the second SIM.

In some aspects, a UE for wireless communication includes a memory; and one or more processors, coupled to the memory, configured to: detect a first communication, associated with a first SIM operating in a connected mode, that is at least partially overlapping in a time domain with a second communication associated with a second SIM operating in an idle mode; detect that a transmit chain associated with the first SIM and a receive chain associated with the second SIM are sharing an antenna switch; and perform a preventive action based at least in part on the first communication associated with the first SIM overlapping in the time domain with the second communication associated with the second SIM while the transmit chain associated with the first SIM and the receive chain associated with the second SIM are sharing the antenna switch.

In some aspects, the second communication associated with the second SIM includes activity to prepare or program one or more components in the receive chain associated with the second SIM to demodulate or decode a received signal.

In some aspects, the preventive action is to limit an allowable output power from the transmit chain associated with the first SIM to a maximum value that satisfies a ruggedness or reliability parameter associated with a power amplifier in the transmit chain associated with the first SIM.

In some aspects, the maximum value for the allowable output power is a minimum of the ruggedness or reliability parameter associated with the power amplifier and one or more additional limits on the allowable output power from the transmit chain associated with the first SIM.

In some aspects, the preventive action is to stop or suspend transmission activity associated with the first SIM while the first communication associated with the first SIM is overlapping in the time domain with the second communication associated with the second SIM.

In some aspects, the one or more processors are further configured to: resume the transmission activity associated with the first SIM based at least in part on the first communication associated with the first SIM ceasing to overlap in the time domain with the second communication associated with the second SIM.

In some aspects, the preventive action is to deny the second communication associated with the second SIM that overlaps in the time domain with the first communication associated with the first SIM.

In some aspects, the one or more processors are further configured to: determine a first priority for the first communication associated with the first SIM and a second priority for the second communication associated with the second SIM; and select the preventive action based at least in part on the first priority and the second priority.

In some aspects, the preventive action is to limit an allowable output power from the transmit chain associated with the first SIM or to stop or suspend transmission activity associated with the first SIM based at least in part on the second communication associated with the second SIM having a higher priority than the first communication associated with the first SIM.

In some aspects, the preventive action is to deny the second communication associated with the second SIM that overlaps in the time domain with the first communication associated with the first SIM based at least in part on the first communication associated with the first SIM having a higher priority than the second communication associated with the second SIM.

In some aspects, a non-transitory computer-readable medium storing a set of instructions for wireless communication includes one or more instructions that, when executed by one or more processors of a UE, cause the UE to: detect a first communication, associated with a first SIM operating in a connected mode, that is at least partially overlapping in a time domain with a second communication associated with a second SIM operating in an idle mode; detect that a transmit chain associated with the first SIM and a receive chain associated with the second SIM are sharing an antenna switch; and perform a preventive action based at least in part on the first communication associated with the first SIM overlapping in the time domain with the second communication associated with the second SIM while the transmit chain associated with the first SIM and the receive chain associated with the second SIM are sharing the antenna switch.

In some aspects, the second communication associated with the second SIM includes activity to prepare or program one or more components in the receive chain associated with the second SIM to demodulate or decode a received signal.

In some aspects, the one or more instructions further cause the UE to limit an allowable output power from the transmit chain associated with the first SIM to a maximum value that satisfies a ruggedness or reliability parameter associated with a power amplifier in the transmit chain associated with the first SIM.

In some aspects, the maximum value for the allowable output power is a minimum of the ruggedness or reliability parameter associated with the power amplifier and one or more additional limits on the allowable output power from the transmit chain associated with the first SIM.

In some aspects, the one or more instructions further cause the UE to stop or suspend transmission activity associated with the first SIM while the first communication associated with the first SIM is overlapping in the time domain with the second communication associated with the second SIM.

In some aspects, the one or more instructions further cause the UE to: resume the transmission activity associated with the first SIM based at least in part on the first communication associated with the first SIM ceasing to overlap in the time domain with the second communication associated with the second SIM.

In some aspects, the one or more instructions further cause the UE to deny the second communication associated with the second SIM that overlaps in the time domain with the first communication associated with the first SIM.

In some aspects, the one or more instructions further cause the UE to: determine a first priority for the first communication associated with the first SIM and a second priority for the second communication associated with the second SIM; and select the preventive action based at least in part on the first priority and the second priority.

In some aspects, the one or more instructions further cause the UE to limit an allowable output power from the transmit chain associated with the first SIM or to stop or suspend transmission activity associated with the first SIM based at least in part on the second communication associated with the second SIM having a higher priority than the first communication associated with the first SIM.

In some aspects, the one or more instructions further cause the UE to deny the second communication associated with the second SIM that overlaps in the time domain with the first communication associated with the first SIM based at least in part on the first communication associated with the first SIM having a higher priority than the second communication associated with the second SIM.

In some aspects, an apparatus for wireless communication includes means for detecting a first communication, associated with a first SIM operating in a connected mode, that is at least partially overlapping in a time domain with a second communication associated with a second SIM operating in an idle mode; means for detecting that a transmit chain associated with the first SIM and a receive chain associated with the second SIM are sharing an antenna switch; and means for performing a preventive action based at least in part on the first communication associated with the first SIM overlapping in the time domain with the second communication associated with the second SIM while the transmit chain associated with the first SIM and the receive chain associated with the second SIM are sharing the antenna switch.

In some aspects, the second communication associated with the second SIM includes activity to prepare or program one or more components in the receive chain associated with the second SIM to demodulate or decode a received signal.

In some aspects, the apparatus includes means for limiting an allowable output power from the transmit chain associated with the first SIM to a maximum value that satisfies a ruggedness or reliability parameter associated with a power amplifier in the transmit chain associated with the first SIM.

In some aspects, the maximum value for the allowable output power is a minimum of the ruggedness or reliability parameter associated with the power amplifier and one or more additional limits on the allowable output power from the transmit chain associated with the first SIM.

In some aspects, the apparatus includes means for stopping or suspend transmission activity associated with the first SIM while the first communication associated with the first SIM is overlapping in the time domain with the second communication associated with the second SIM.

In some aspects, the apparatus includes means for resuming the transmission activity associated with the first SIM based at least in part on the first communication associated with the first SIM ceasing to overlap in the time domain with the second communication associated with the second SIM.

In some aspects, the apparatus includes means for denying the second communication associated with the second SIM that overlaps in the time domain with the first communication associated with the first SIM.

In some aspects, the apparatus includes means for determining a first priority for the first communication associated with the first SIM and a second priority for the second communication associated with the second SIM; and means for selecting the preventive action based at least in part on the first priority and the second priority.

In some aspects, the apparatus includes means for limiting an allowable output power from the transmit chain associated with the first SIM or to stop or suspend transmission activity associated with the first SIM based at least in part on the second communication associated with the second SIM having a higher priority than the first communication associated with the first SIM.

In some aspects, the apparatus includes means for denying the second communication associated with the second SIM that overlaps in the time domain with the first communication associated with the first SIM based at least in part on the first communication associated with the first SIM having a higher priority than the second communication associated with the second SIM.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
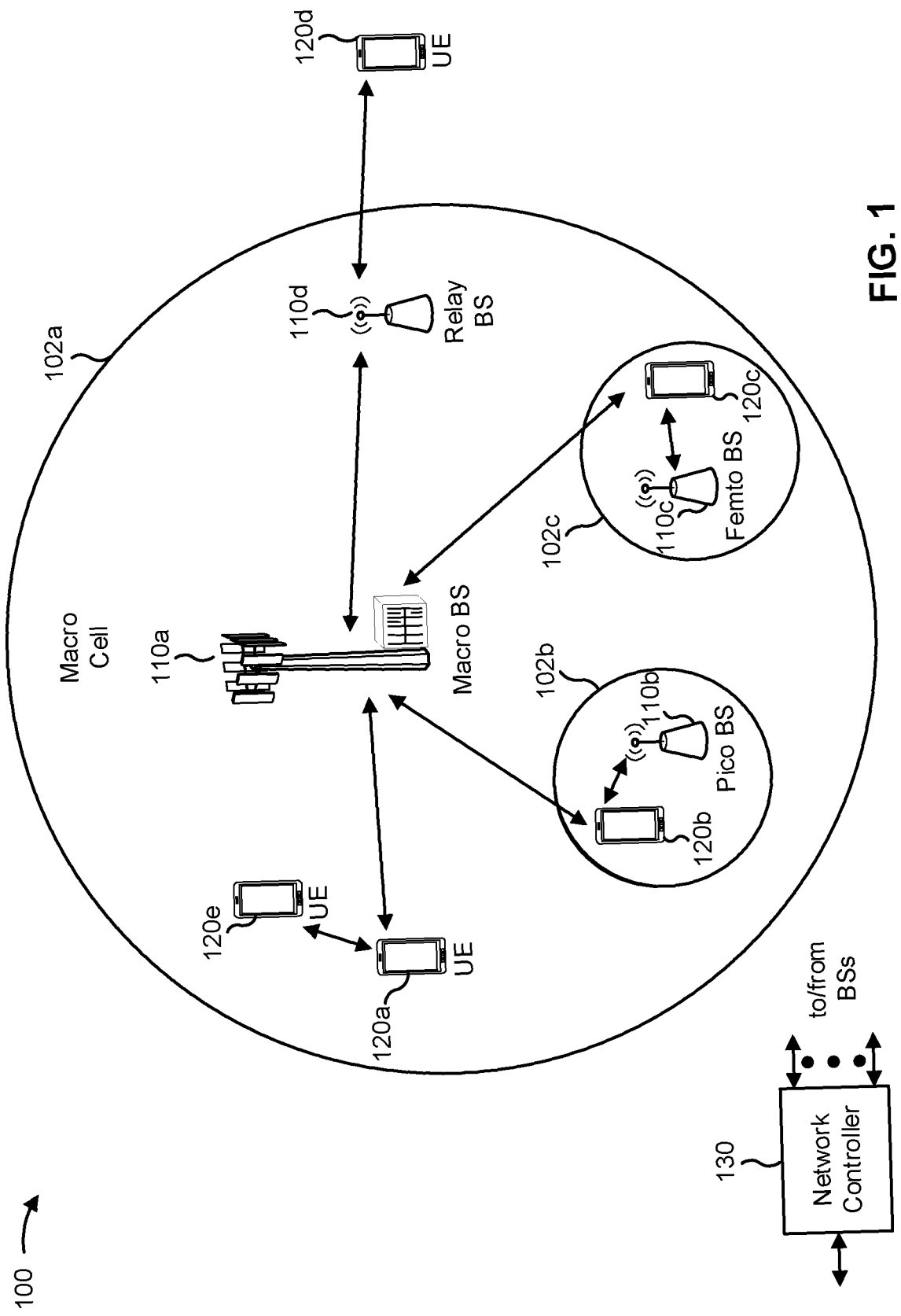
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
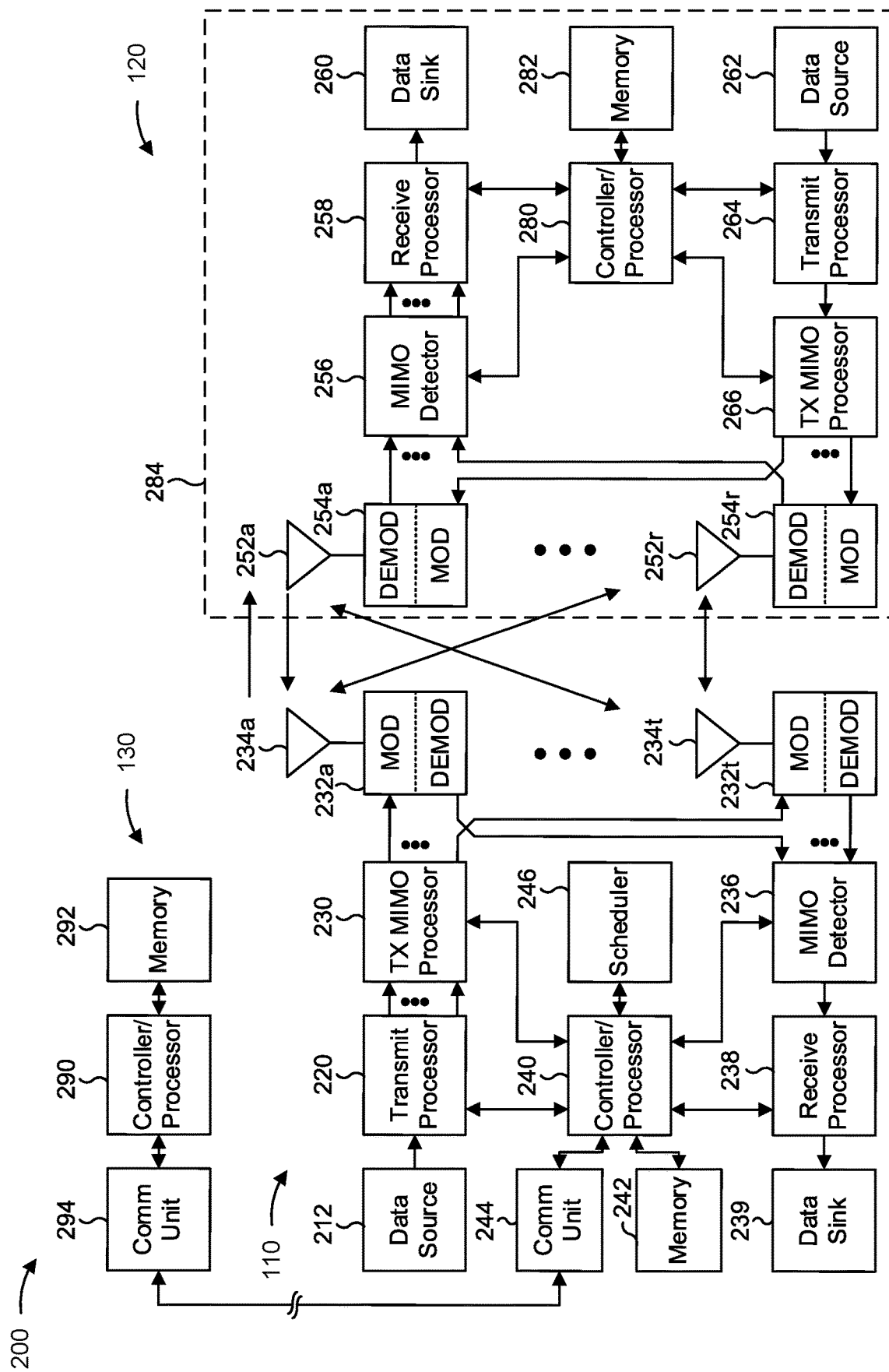
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with managing power amplifier reliability for multi-subscriber identity module (SIM) antenna switching concurrency, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7 and/or other processes as described herein. In some aspects, executing instructions may include running the instructions, converting the instructions, compiling the instructions, and/or interpreting the instructions, among other examples.

In some aspects, the UE 120 includes means for detecting a first communication, associated with a first SIM operating in a connected mode, that is at least partially overlapping in a time domain with a second communication associated with a second SIM operating in an idle mode; means for detecting that a transmit chain associated with the first SIM and a receive chain associated with the second SIM are sharing an antenna switch; and/or means for performing a preventive action based at least in part on the first communication associated with the first SIM overlapping in the time domain with the second communication associated with the second SIM while the transmit chain associated with the first SIM and the receive chain associated with the second SIM are sharing the antenna switch. The means for the user equipment (UE) to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for resuming the transmission activity associated with the first SIM based at least in part on the first communication associated with the first SIM ceasing to overlap in the time domain with the second communication associated with the second SIM.

In some aspects, the UE 120 includes means for determining a first priority for the first communication associated with the first SIM and a second priority for the second communication associated with the second SIM; and/or means for selecting the preventive action based at least in part on the first priority and the second priority.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
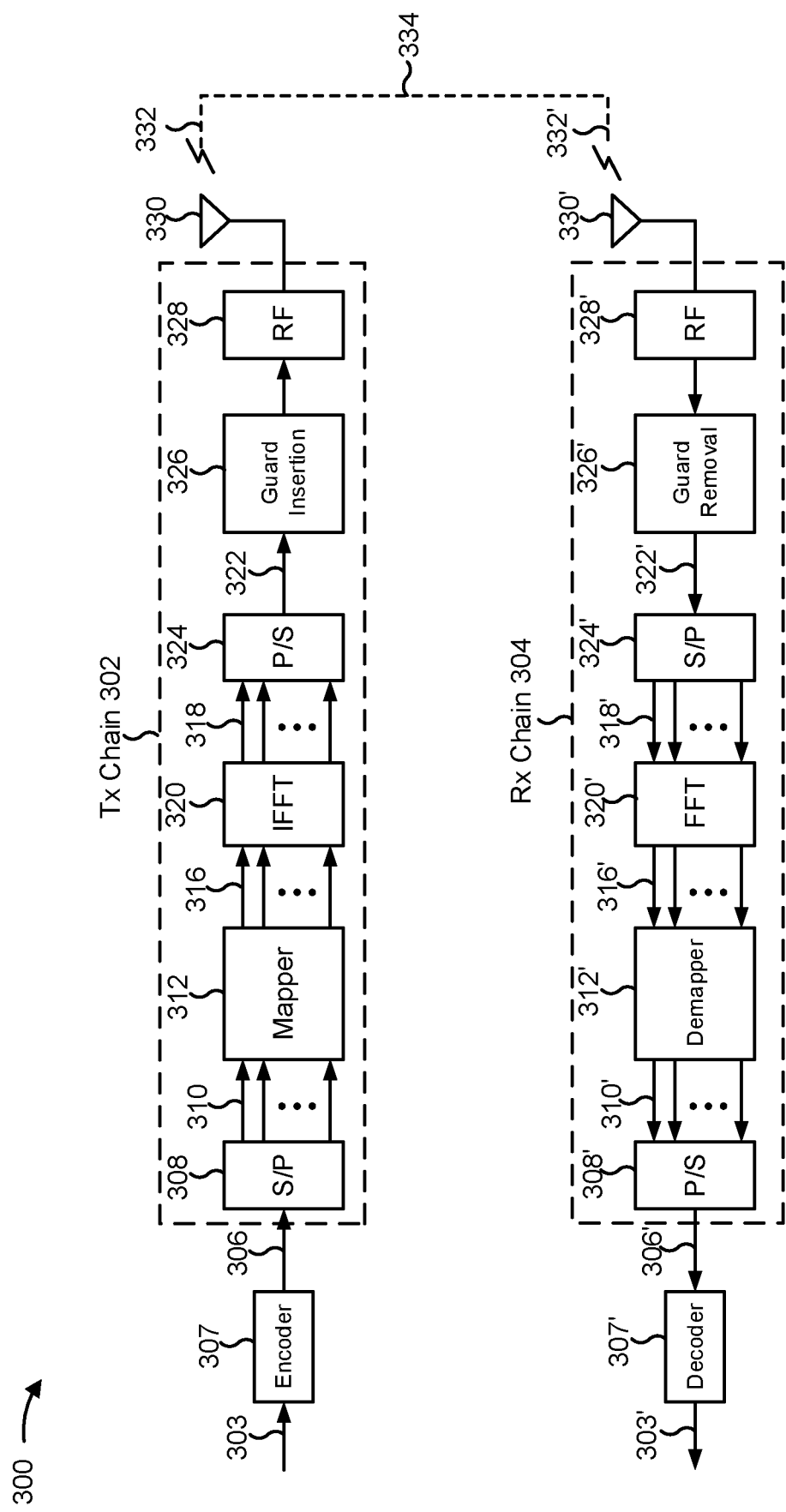
FIG. 3 is a diagram illustrating an example of a transmit chain and a receive chain of a UE, in accordance with the present disclosure.

FIG. 3 is a diagram illustrating an example 300 of a transmit (Tx) chain 302 and a receive (Rx) chain 304 of a UE 120, in accordance with the present disclosure. In some aspects, one or more components of Tx chain 302 may be implemented in transmit processor 264, TX MIMO processor 266, MOD/DEMOD 254, and/or controller/processor 280, as described above in connection with FIG. 2. In some aspects, Tx chain 302 may be implemented in UE 120 for transmitting data 306 (e.g., uplink data, an uplink reference signal, and/or uplink control information) to base station 110 on an uplink channel and/or another UE 120 on a sidelink channel.

An encoder 307 may alter a signal (e.g., a bitstream) 303 into data 306. Data 306 to be transmitted is provided from encoder 307 as input to a serial-to-parallel (S/P) converter 308. In some aspects, S/P converter 308 may split the transmission data into N parallel data streams 310.

The N parallel data streams 310 may then be provided as input to a mapper 312. Mapper 312 may map the N parallel data streams 310 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 312 may output N parallel symbol streams 316, each symbol stream 316 corresponding to one of N orthogonal subcarriers of an inverse fast Fourier transform (IFFT) component 320. These N parallel symbol streams 316 are represented in the frequency domain and may be converted into N parallel time domain sample streams 318 by IFFT component 320.

In some aspects, N parallel modulations in the frequency domain correspond to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of guard insertion component 326 may then be upconverted to a desired transmit frequency band by a radio frequency (RF) front end 328, which may include a power amplifier (PA), one or more antenna switches, and/or one or more other suitable components. An antenna 330 may then transmit the resulting signal 332.

In some aspects, Rx chain 304 may utilize OFDM/OFDMA. In some aspects, one or more components of Rx chain 304 may be implemented in receive processor 258, MIMO detector 256, MOD/DEMOD 254, and/or controller/processor 280, as described above in connection with FIG. 2. In some aspects, Rx chain 304 may be implemented in UE 120 for receiving data 306 (e.g., downlink data, a downlink reference signal, and/or downlink control information) from base station 110 on a downlink channel and/or another UE 120 on a sidelink channel.

A transmitted signal 332 is shown traveling over a wireless channel 334 from Tx chain 302 to Rx chain 304. When a signal 332' is received by an antenna 330', the received signal 332' may be downconverted to a baseband signal by an RF front end 328', which may include a low noise amplifier (LNA), one or more antenna switches, and/or one or more other suitable components. A guard removal component 326' may then remove the guard interval that was inserted between OFDM/OFDMA symbols by guard insertion component 326.

The output of guard removal component 326' may be provided to an S/P converter 324'. The output may include an OFDM/OFDMA symbol stream 322', and S/P converter 324' may divide the OFDM/OFDMA symbol stream 322' into N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by mapper 312, thereby outputting N parallel data streams 310'. A P/S converter 308' may combine the N parallel data streams 310' into a single data stream 306'. Ideally, data stream 306' corresponds to data 306 that was provided as input to Tx chain 302. Data stream 306' may be decoded into a decoded data stream 303' by decoder 307'.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components shown in FIG. 3.

Figure 4:
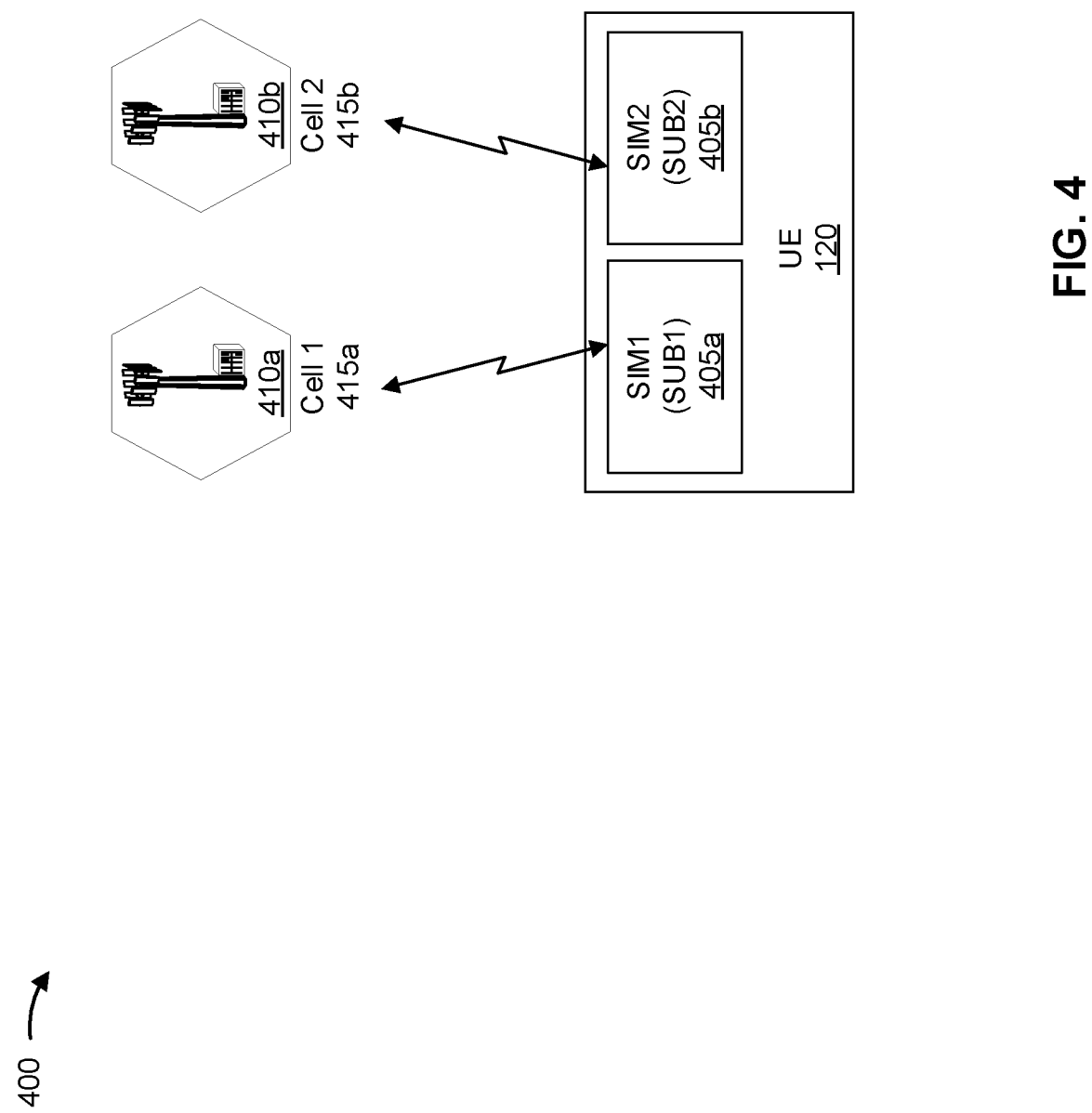
FIG. 4 is a diagram illustrating an example of a multiple subscriber identity module (multi-SIM) UE, in accordance with the present disclosure.

FIG. 4 is a diagram illustrating an example 400 of a multi-SIM UE, in accordance with the present disclosure. As shown in FIG. 4, a UE 120 may be a multiple SIM (multi-SIM) UE that includes multiple SIMS (two or more SIMs), shown as a first SIM 405*a* and a second SIM 405*b*. The first SIM 405*a* may be associated with a first subscription (shown as SUB1), and the second SIM 405*b* may be associated with a second subscription (shown as SUB2). A subscription may include a subscription with a network operator (e.g., a mobile network operator (MNO)) that enables the UE 120 to access a wireless network (e.g., a radio access network (RAN)) associated with the network operator. In some aspects, the first subscription and the second subscription may be associated with the same networks operators or with different network operators.

A SIM 405 may be a removable SIM (e.g., a SIM card) or an embedded SIM. A SIM 405 may include an integrated circuit that securely stores an international mobile subscriber identity (IMSI) and a security key, which are used to identify and authenticate a corresponding subscription associated with the SIM 405. In some cases, a SIM 405 may store a list of services that the UE 120 has permission to access using a subscription associated with the SIM 405, such as a data service or a voice service, among other examples.

As further shown in FIG. 4, the UE 120 may communicate (e.g., in a connected mode, an idle mode, or an inactive mode) with a first base station 410a via a first cell 415a (shown as Cell 1) using the first SIM 405a. In this case, the first subscription of the UE 120 may be used to access the first cell 415a (e.g., using a first IMSI for UE identification, using a first security key for UE authentication, using a first list of services that the UE 120 is permitted to access using the first subscription, or by counting data or voice usage on the first cell against the first subscription, among other examples). Similarly, the UE 120 may communicate (e.g., in a connected mode, an idle mode, or an inactive mode) with a second base station 410b via a second cell 415b (shown as Cell 2) using the second SIM 405b. In this case, the second subscription of the UE 120 may be used to access the second cell 415b (e.g., using a second IMSI for UE identification, using a second security key for UE authentication, using a second list of services that the UE 120 is permitted to access using the second subscription, or by counting data or voice usage on the second cell against the second subscription, among other examples).

The first base station 410a and/or the second base station 410b may include one or more of the base stations 110 described above in connection with FIG. 1. Although the first cell 415a and the second cell 415b are shown as being provided by different base stations, in some aspects, the first cell 415 and the second cell 415b may be provided by the same base station. Thus, in some aspects, the first base station 410a and the second base station 410b may be integrated into a single base station.

In some cases, the UE 120 may be a single receiver (SR) (sometimes also referred to as single radio) multi-SIM UE, such as an SR multi-SIM multiple standby (SR-MSMS) UE or a single receiver dual SIM dual standby (SR-DSDS) UE, among other examples. A multi-SIM UE may be capable of switching between two separate mobile network services, may include hardware for maintaining multiple connections (e.g., one connection per SIM) in a standby state, or may include hardware (e.g., multiple transceivers) for maintaining multiple network connections at the same time, among other examples. However, an SR-DSDS UE or an SR-MSMS UE may only be capable of receiving data on one connection at a time because radio frequency resources are shared between the multiple subscriptions. For example, an SR-DSDS UE or an SR-MSMS UE may be associated with multiple subscriptions but may include only a single transceiver shared by the multiple subscriptions, a single transmit chain shared by the multiple subscriptions, or a single receive chain shared by the multiple subscriptions, among other examples.

Alternatively, in some cases, the UE 120 may have dual receive, dual SIM, dual standby (DR-DSDS) capabilities, which may allow both SIMs 405a, 405b to concurrently receive, although only one SIM can transmit at a time (e.g., on a time-sharing basis). For example, transmit and receive operations may be enabled for the first SIM 405a in a connected mode, and only receive operations may be enabled for the second SIM 405b while the first SIM 405a is in connected mode, or vice versa.

As indicated above, FIG. 4 is provided as an example. Other examples may differ from what is described with regard to FIG. 4.

FIGS. 5A-5E are diagrams illustrating examples 500 of concurrent transmit and receive operations causing potential power amplifier reliability issues in a multi-SIM UE, in accordance with the present disclosure. In some cases, as described herein, examples 500 relate to concurrent transmit and receive operations that may occur in a multi-SIM UE having DR-DSDS capabilities, whereby a first SIM (shown in FIGS. 5A-5E as SIM1) may operate in a connected mode in which transmit (Tx) and receive (Rx) operations are enabled while a second SIM (shown in FIGS. 5A-5E as SIM2) may operate in an idle mode in which only Rx operations are enabled. Accordingly, in some cases, Rx activity associated with the second SIM may be concurrent with Tx activity associated with the first SIM.

Figure 5A:
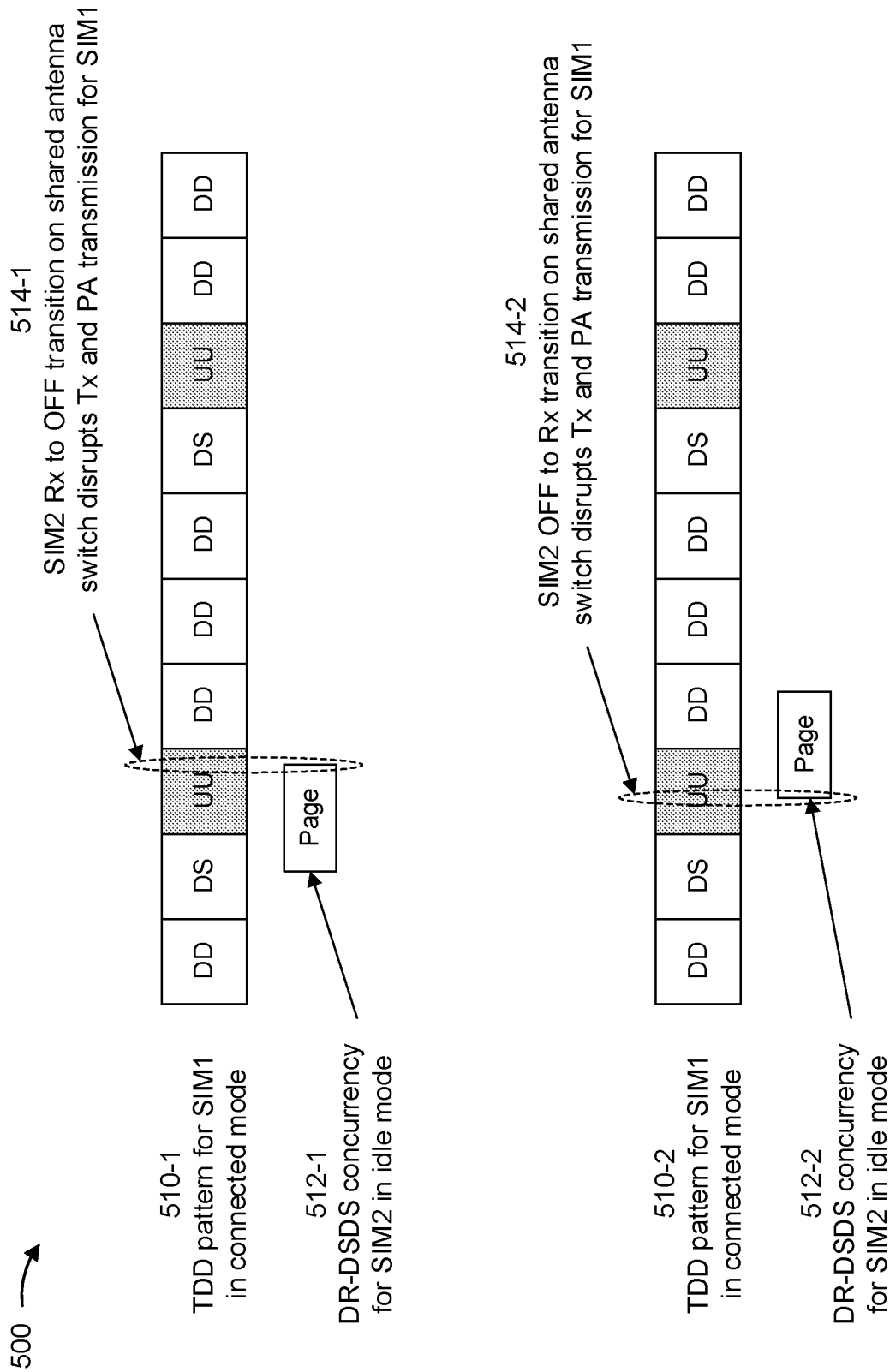
FIGS. 5A-5E are diagrams illustrating examples of concurrent transmit and receive operations causing potential power amplifier reliability issues in a multi-SIM UE, in accordance with the present disclosure.
Figure 5B:
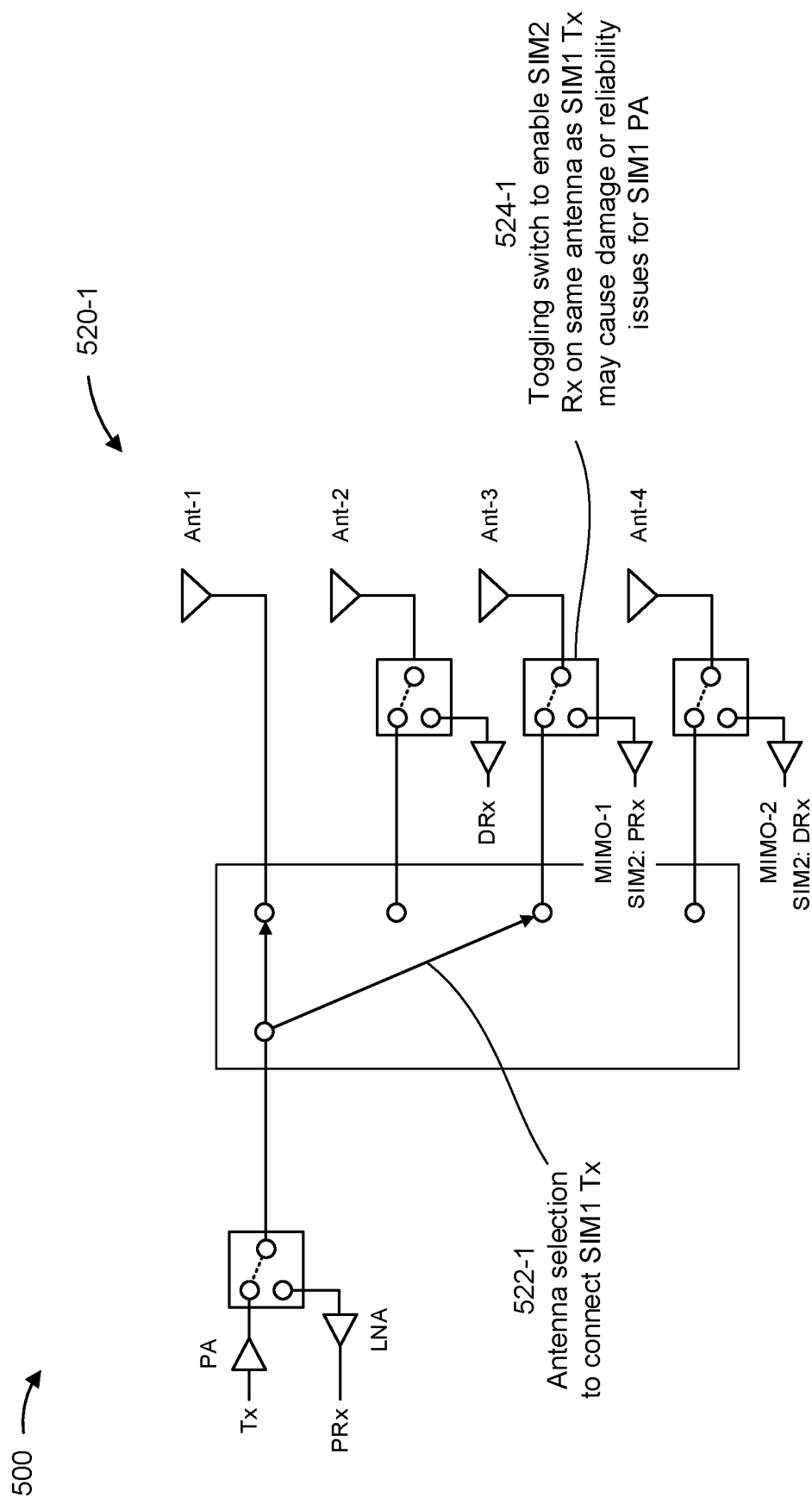

For example, as shown in FIG. 5A, and by reference number 510-1 and 510-2, a time division duplexing (TDD) pattern may be configured (e.g., by a base station) for the first SIM associated with the multi-SIM UE when the first SIM is in a connected mode. As shown, the TDD pattern may generally indicate whether a slot is configured as a downlink slot (shown in FIG. 5A as DD) in which Rx activity may be scheduled for the multi-SIM UE, an uplink slot (shown in FIG. 5A as UU) in which Tx activity may be scheduled for the multi-SIM UE, or a special slot (shown in FIG. 5A as DS) in which one or more symbols in an earlier portion of the slot are used for Rx activity and one or more symbols in a later portion of the slot are used to transition from Rx activity to Tx activity. As described in further detail below with reference to FIGS. 5B-5E, the multi-SIM UE may include multiple antennas and an RF front end (RFFE) with multiple antenna switches that allow a Tx chain to select a particular transmit antenna (e.g., based on an antenna switched diversity (Asdiv) technique and/or a sounding reference signal (SRS) antenna switching configuration) via the antenna switches in the RFFE. Accordingly, in the special slot, the multi-SIM UE may prepare and/or program analog and/or digital components in the Tx chain for transmission, which may include toggling one or more antenna switches to connect the Tx chain to a particular transmit antenna.

As further shown in FIG. 5A, and by reference numbers 512-1 and 512-2, DR-DSDS concurrency may be enabled for the second SIM associated with the multi-SIM UE when the second SIM is in an idle mode. For example, the DR-DSDS concurrency may generally allow one SIM to conduct Rx operations concurrently with another SIM conducting Tx operations or Rx operations. In some cases, however, the first SIM and the second SIM may be associated with different wireless networks that are provided by different network operators, whereby the concurrent activity associated with the two SIMs may not be synchronized. In other words, Rx activity scheduled for the second SIM operating in idle mode may at least partially overlap in a time domain with Tx activity scheduled for the first SIM operating in connected mode.

For example, as shown by reference number 512-1, Rx activity such as paging reception may be scheduled for the second SIM (e.g., in a paging occasion associated with the multi-SIM UE) at a time that starts prior to the uplink slot for the first SIM and overlaps with the uplink slot in which Tx activity is scheduled for the first SIM. In this case, as shown by reference number 514-1, Tx activity for the first SIM may be disrupted and potentially cause damage or reliability issues for a power amplifier in a Tx chain when the second SIM transitions from performing Rx activity to an off state if the first SIM and the second SIM are connected to the same antenna switch. Additionally, or alternatively, as shown by reference number 512-2, Rx activity may be scheduled for the second SIM at a time that starts during the uplink slot for the first SIM. In this case, as shown by reference number 514-2, the second SIM transitioning from the off state to performing Rx activity may cause damage or reliability issues for the power amplifier in the Tx chain when there is ongoing Tx activity for the first SIM if the first SIM and the second SIM are connected to the same antenna switch.

Accordingly, in cases where a multi-SIM UE having DR-DSDS capabilities includes a first SIM operating in connected mode and a second SIM operating in idle mode, Rx activity for the second SIM may cause damage or reliability issues for a power amplifier in a Tx chain associated with the first SIM in cases where the first SIM and the second SIM are sharing an antenna switch and the Rx activity for the second SIM at least partially overlaps in a time domain with the Tx activity for the first SIM.

For example, FIGS. 5B-5E illustrate various examples 520-1, 520-2, 520-3, 520-4 of an RF architecture that includes multiple antennas and multiple antenna switches to support DR-DSDS capabilities in a multi-SIM UE. For example, as shown in FIGS. 5B-5E, a SIM in connected mode may include a Tx chain with a power amplifier (PA) configured to transmit (e.g., deliver power) towards the multiple antennas. The power amplifier may be connected to a switching element that may toggle between the Tx chain and a low noise amplifier (LNA) associated with a primary receive (PRx) path. As shown in FIGS. 5B-5E by reference numbers 522-1 through 522-4, the switching element may be coupled to a dedicated antenna (Ant-1), and antenna selection may be performed (e.g., based on an Asdiv technique and/or an SRS antenna switching configuration) to connect the Tx chain to a second antenna (e.g., Ant-2, Ant-3, or Ant-4).

Figure 5C:
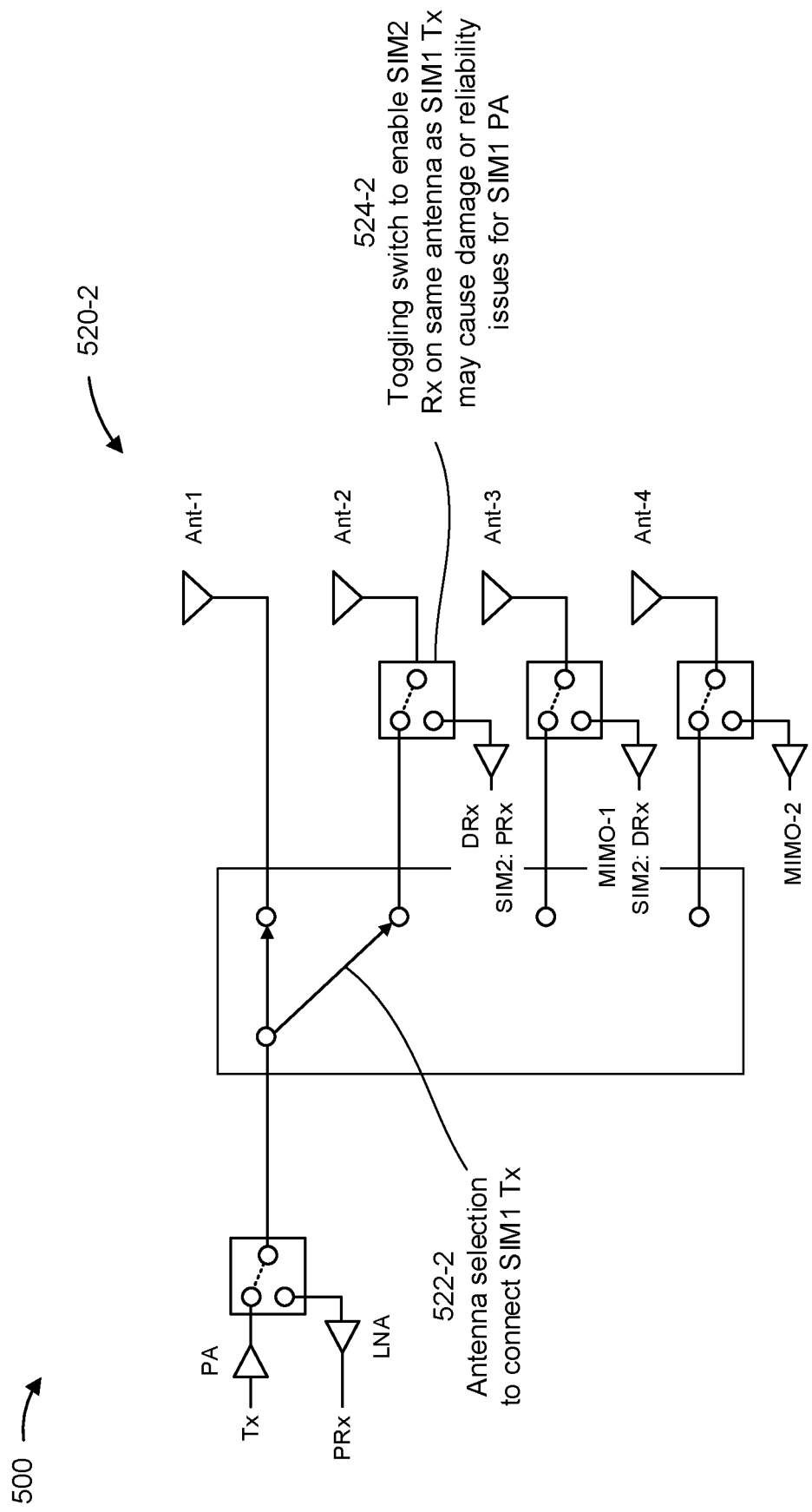
Figure 5D:
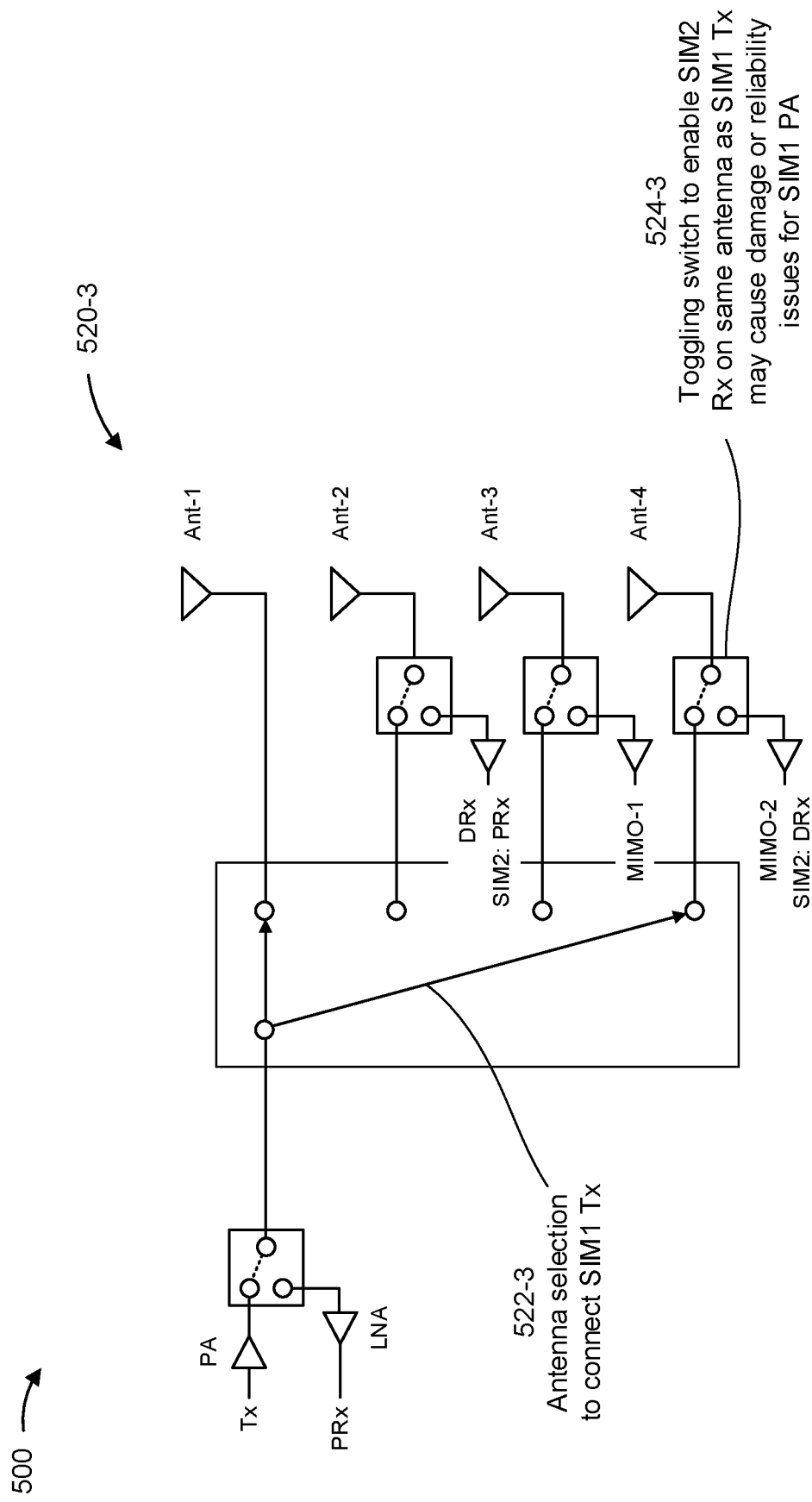
Figure 5E:
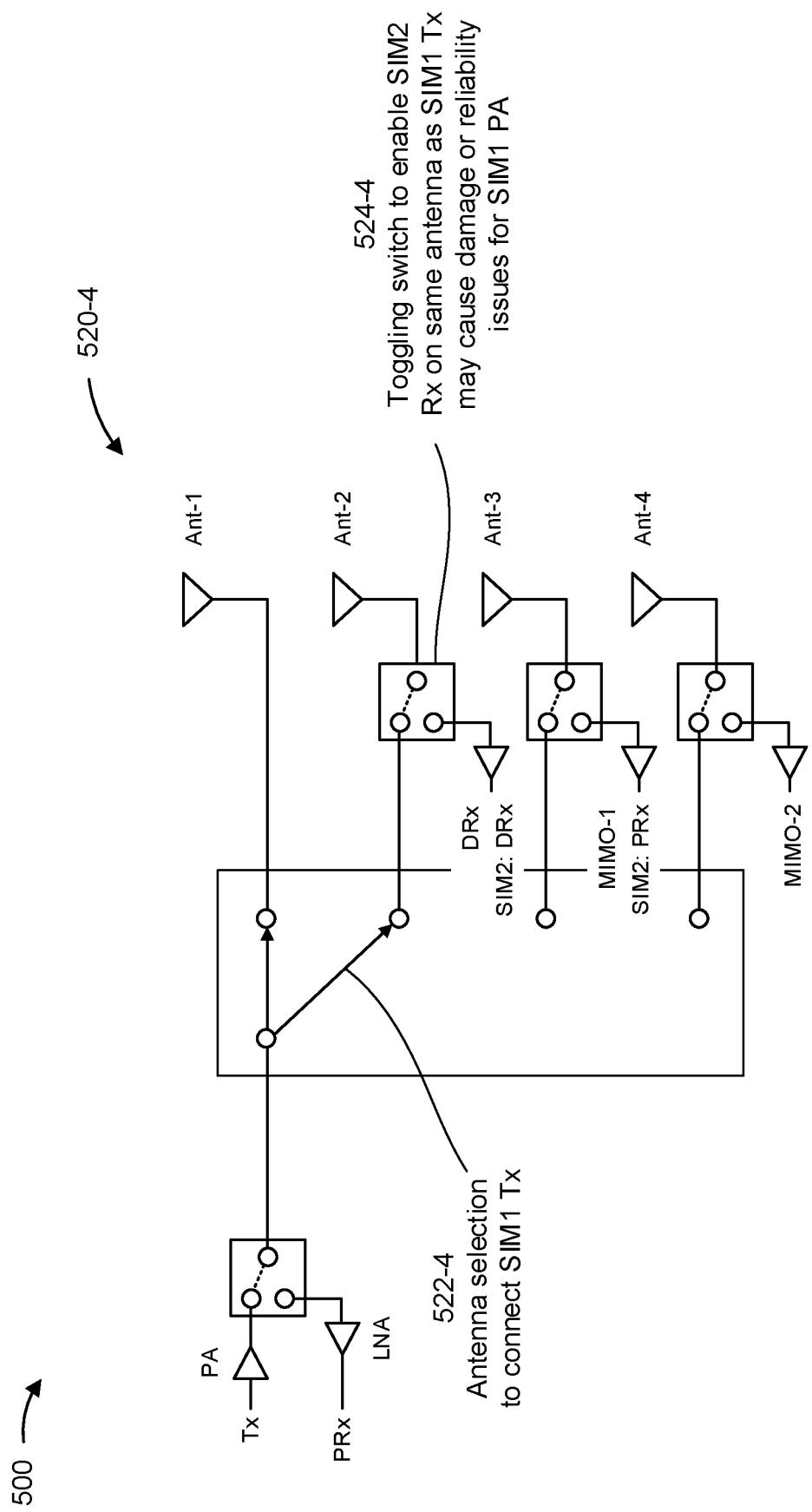

Accordingly, when the first SIM is in connected mode, the first SIM may be operating in a TDD device hopping mode, whereby the Tx chain associated with the first SIM can be switched among different antennas, while an Rx hardware path to the different antennas is in a default configuration (e.g., the Rx chain does not switch between different antennas to minimize RFFE loss due to switching). For example, in FIG. 5B, a diversity receive (DRx) path for the first SIM is connected to the second antenna, a PRx path for the second SIM is connected to the third antenna, and the DRx path for the second SIM is connected to the fourth antenna. In other examples, FIG. 5C illustrates an Rx configuration in which the DRx path for the first SIM and the PRx path for the second SIM are connected to the second antenna and the DRx path for the second SIM is connected to the third antenna, FIG. 5D illustrates an Rx configuration in which the DRx path for the first SIM and the PRx path for the second SIM are connected to the second antenna and the DRx path for the second SIM is connected to the fourth antenna, and FIG. 5E illustrates an Rx configuration in which the DRx paths for the first and second SIM are both connected to the second antenna while the PRx path for the second SIM is connected to the third antenna.

Accordingly, as shown by reference numbers 524-1 through 524-4, toggling an antenna switch to enable Rx activity for the second SIM on the antenna connected to the Tx chain of the first SIM may cause damage or reliability issues for the power amplifier in the Tx chain. For example, before the switch is toggled, the power amplifier is transmitting into a circuit that is terminated at the corresponding antenna. However, when the switch is toggled to enable Rx activity for the second SIM while there is ongoing Tx activity for the first SIM, the power amplifier may start to transmit into an open (e.g., unterminated) circuit, which causes the power to be reflected back towards the power amplifier. This may create a standing wave at the power amplifier, which may cause burnouts or reliability issues at the power amplifier.

Some aspects described herein relate to techniques and apparatuses to manage power amplifier reliability in a multi-SIM UE having DR-DSDS capabilities to enable antenna switching concurrency between a first SIM operating in connected mode and a second SIM operating in idle mode. For example, in cases where the first SIM and the second SIM are connected to the same antenna switch and Tx activity for the first SIM at least partially overlaps in a time domain with Rx activity for the second SIM, a modem controller that manages the first SIM and the second SIM may perform a preventive action to protect the power amplifier in the Tx chain of the first SIM. For example, in some aspects, the protective action may be to limit the output power from the power amplifier to satisfy a threshold related to a ruggedness or reliability parameter associated with a power amplifier, stop or suspend the Tx activity associated with the first SIM, and/or deny the Rx activity associated with the second SIM (e.g., allowing the Tx activity associated with the first SIM to proceed). In this way, the modem controller may detect a condition that may potentially result in damage or reliability issues for the power amplifier and implement appropriate action to protect the power amplifier.

As indicated above, FIGS. 5A-5E are provided as examples. Other examples may differ from what is described with regard to FIGS. 5A-5E.

Figure 6A:
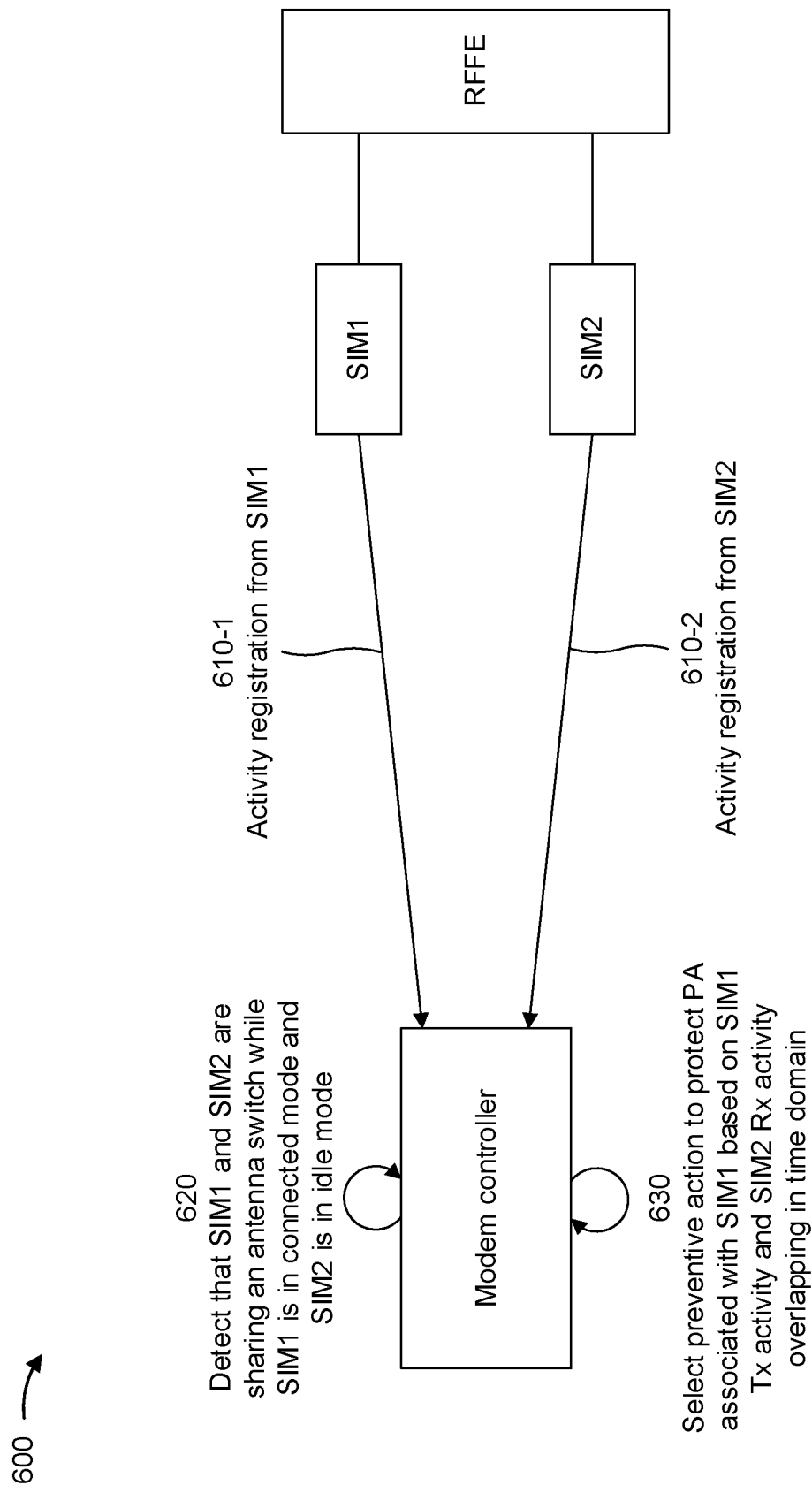
FIGS. 6A-6B are diagrams illustrating examples associated with managing power amplifier reliability for multi-SIM antenna switching concurrency, in accordance with the present disclosure.
Figure 6B:
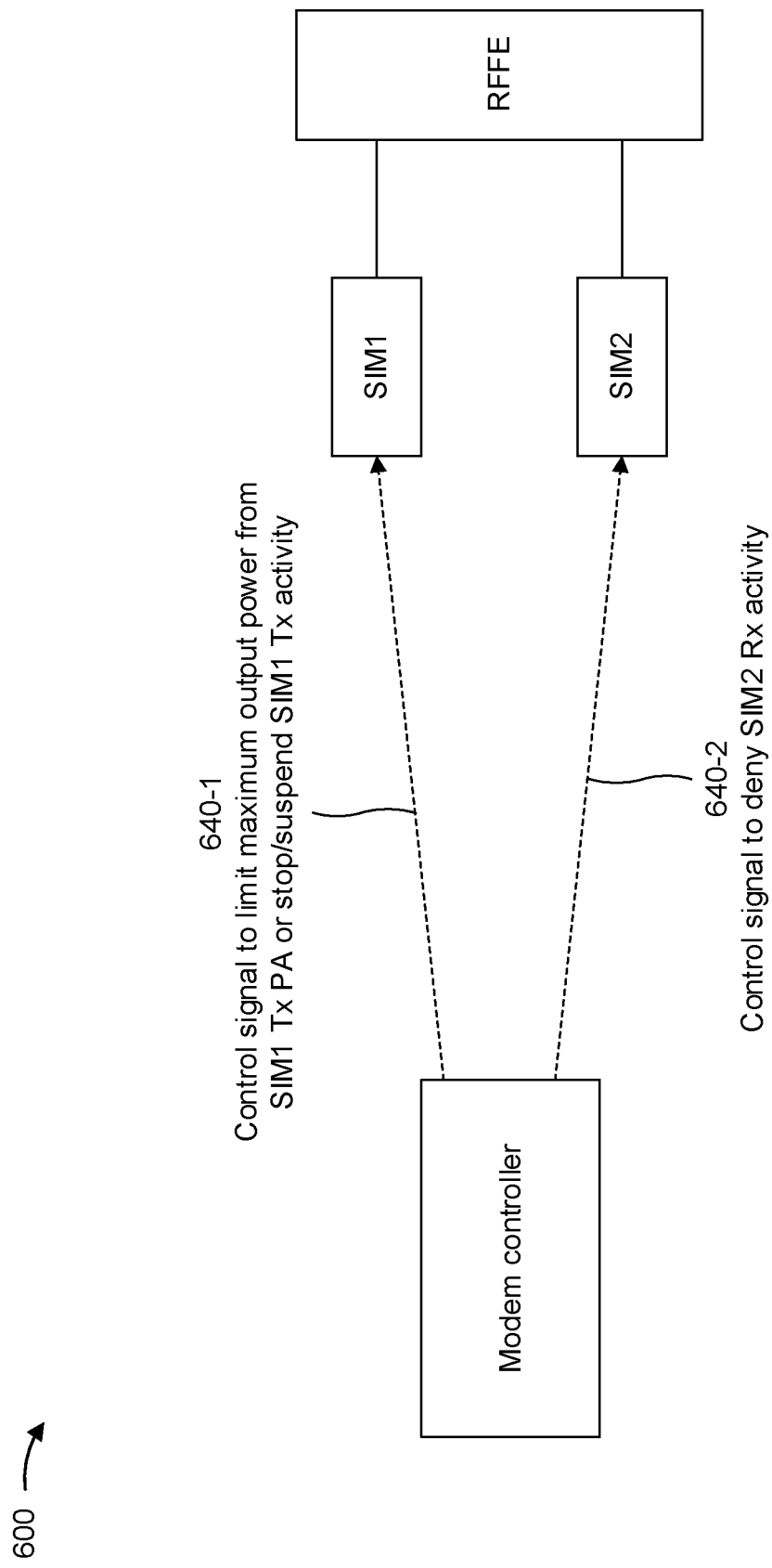

FIGS. 6A-6B are diagrams illustrating examples 600 associated with managing power amplifier reliability for multi-SIM antenna switching concurrency, in accordance with the present disclosure. As shown in FIGS. 6A-6B, example(s) 600 include a multi-SIM UE having a first SIM (SIM1) and a second SIM (SIM2) that may support DR-DSDS capabilities, whereby one SIM can conduct Tx and Rx activities (e.g., in connected mode) concurrently with a second SIM conducting only Rx activities (e.g., in idle mode). Furthermore, as shown, the first SIM and the second SIM share a radio frequency front-end (RFFE) that includes multiple antennas and multiple antenna switches or switching elements. For example, as described above, a Tx path associated with a SIM in connected mode may operate in a TDD device hopping mode, whereby the Tx path can be switched between different antennas and Rx paths to the antennas are in a default (e.g., static or fixed) configuration to minimize RFFE loss due to switching. Furthermore, as shown, the multi-SIM UE includes a modem controller that may control one or more operations for the first SIM and the second SIM.

As shown in FIG. 6A, and by reference numbers 610-1 and 610-2, the modem controller may receive activity registration information from the first SIM and the second SIM. For example, as described herein, the first SIM and the second SIM may be associated with the same wireless network, different wireless networks, the same network operator, or different network operators, among other examples. Accordingly, activity associated with the first SIM may be asynchronous in time with respect to activity associated with the second SIM (e.g., where the first SIM and the second SIM are associated with different wireless networks or different network operators that are not synchronized with one another). Consequently, in some cases, Rx activity scheduled on the second SIM may overlap in time with Tx activity scheduled on the first SIM, or vice versa. Accordingly, in some aspects, the first SIM and the second SIM may register scheduled activities with the modem controller in advance such that that the modem controller can detect potential conditions that may result in damage or reliability issues for a power amplifier in a Tx chain for a SIM in connected mode.

Furthermore, in some aspects, the registered activity may be associated with a priority value (e.g., based on a type of traffic or information to be communicated). For example, in some aspects, the modem controller may use the priority value associated with registered Tx and/or Rx activities to make decisions regarding which preventive action(s) to perform in cases where the modem controller detects a condition that may result in damage or reliability issues for a power amplifier in a Tx chain for a SIM in connected mode. In some aspects, the first SIM and/or the second SIM may indicate the priority value when registering the respective activities associated with the first SIM and the second SIM. Additionally, or alternatively, the first SIM and/or the second SIM may indicate the type of traffic or information to be communicated, and the modem controller may determine the appropriate priority values based on the type of traffic or information to be communicated.

As further shown in FIG. 6A, and by reference number 620, the modem controller may detect that the first SIM and the second SIM are sharing an antenna switch while the first SIM is in connected mode and the second SIM is in idle mode. Accordingly, the first SIM may be allowed to conduct Tx and Rx operations in connected mode, and the second SIM may be allowed to concurrently conduct only Rx operations in idle mode. In cases where the modem controller detects that the first SIM and the second SIM are connected to the same antenna switch, the modem controller may determine that a potential condition exists whereby Rx activity associated with the second SIM may disrupt Tx activity associated with the first SIM. If the antenna switch shared by the first SIM and the second SIM is toggled such that the corresponding antenna connects to an Rx path of the second SIM (e.g., a PRx path or a DRx path), the power amplifier in the Tx chain of the first SIM may transmit power into an open circuit, which may cause the transmitted power to be reflected back towards the power amplifier and potentially cause damage or reliability issues for the power amplifier. Accordingly, when the first SIM and the second SIM are sharing an antenna switch while the first SIM is in connected mode and the second SIM is in idle mode, the modem controller may determine whether Tx activity associated with the first SIM overlaps in a time domain with Rx activity associated with the second SIM based on the activity registration information received from the first SIM and the second SIM.

As further shown in FIG. 6A, and by reference number 630, the modem controller may select a preventive action to protect the power amplifier associated with the first SIM in cases where Tx activity associated with the first SIM and the Rx activity associated with the second SIM overlap in a time domain while the first SIM and the second SIM are sharing an antenna switch. More particularly, as described above, a standing wave may be created at the power amplifier associated with the first SIM if the shared antenna switch is toggled to connect the corresponding antenna to an Rx path of the second SIM. Accordingly, as described herein, Rx activities may include preparation and/or programming to place analog and/or digital RF components (e.g., an RF transceiver, analog front-end devices, and/or antenna switches, among other examples) into an appropriate setting or configuration to demodulate, decode, or otherwise process a received signal. In other words, any activities that include or are related to toggling the antenna switch to connect the corresponding antenna to the Rx path of the second SIM may create a condition in which the Tx path of the first SIM is unterminated. Accordingly, when such a condition is detected (e.g., there is overlapping Tx and Rx activity for different SIMs sharing an antenna switch), the modem controller may select a preventive action to protect the power amplifier in the Tx path associated with the first SIM.

For example, as shown in FIG. 6B, and by reference number 640-1, the preventive action may be to limit the maximum output power from the power amplifier in the Tx path associated with the first SIM, in which case the modem controller may transmit a control signal to limit the maximum output power to the first SIM. In some aspects, the maximum output power from the power amplifier may be limited to a value that satisfies a threshold related to a ruggedness and/or reliability parameter for the power amplifier. For example, the power amplifier may be manufactured according to ruggedness and/or reliability specifications that define a maximum output power that is unlikely to result in permanent damage to the power amplifier given a particular load and voltage standing wave ratio (VSWR) (e.g., a maximum number of decibel-milliwatts (dBm) that the power amplifier can withstand when transmitting into an open circuit). Accordingly, in cases where the preventive action is to limit the maximum output power from the power amplifier associated with the first SIM, the maximum output power may satisfy (e.g., be less than or equal) to a threshold that is based on the ruggedness and/or reliability specifications associated with the power amplifier.

Additionally, or alternatively, in cases where one or more additional maximum Tx power limits are applicable to the first SIM, the modem controller may take the other maximum Tx power limits into consideration in determining the limit on the maximum output power from the power amplifier. For example, in some cases, the first SIM may be subject to a maximum allowable Tx power limit to protect an Rx low noise amplifier (LNA) in an Rx path of the second SIM from damage due to exposure to high Tx power from the first SIM. Accordingly, in cases where there are multiple maximum power limits applicable to the first SIM, at least one of which is based on the ruggedness or reliability specifications of the power amplifier, the modem controller may determine the maximum allowable Tx power limit for the power amplifier as the minimum of all the maximum allowable power limits applicable to the first SIM. For example, if a maximum allowable Tx power limit for the first SIM is X dBM to protect the Rx LNA of the second SIM from damage due to exposure to high Tx power from the first SIM and a maximum allowable Tx power limit for the first SIM is Y dBM to protect the Tx power amplifier of the first SIM from damage or reliability issues due to Rx activity associated with the second SIM interrupting, disconnecting, or otherwise disrupting Tx activity associated with the first SIM, the maximum allowable power limit for the Tx chain of the first SIM may be determined as min(X, Y).

In some aspects, the first SIM and the second SIM may continue to register upcoming scheduled activity with the modem controller, which may enable the modem controller to determine whether and/or when Tx activity of the first SIM and Rx activity of the second SIM are overlapping in time. Furthermore, in some aspects, the modem controller may have a capability to detect the antenna(s) that the first SIM and the second SIM are connected to, or the first SIM and the second SIM may indicate the respective connected antennas to the modem controller. In this way, the modem controller may be able to determine whether the first SIM and the second SIM are sharing an antenna switch or whether the first SIM and the second SIM are connected to different antenna switches. Accordingly, the modem controller may limit the maximum output power from the power amplifier in the Tx chain of the first SIM while the first SIM and the second SIM are sharing an antenna switch and the Tx activity of the first SIM overlaps in time with Rx activity of the second SIM. Furthermore, unless there are additional limits on the maximum output power of the power amplifier, the modem controller may send a control signal to the first SIM to remove the restriction on the maximum output power when the condition(s) that may cause damage or reliability issues for the power amplifier in the Tx chain associated with the first SIM cease to be satisfied (e.g., the first SIM and the second SIM are no longer sharing an antenna switch, Rx activity of the second SIM has ended, and/or the Tx activity and Rx activity of the respective SIMS are no longer concurrent).

Alternatively, as further shown by reference number 640-1, the preventive action may be to stop or suspend the Tx activity associated with the first SIM in cases where one or more Tx communications associated with the first SIM at least partially overlap in time with one or more Rx communications associated with the second SIM while the first SIM and the second SIM are sharing an antenna switch. In this case, the modem controller may transmit a control signal to the first SIM to indicate that Tx activity for the first SIM is to be stopped or suspended. In some aspects, the first SIM and the second SIM may continue to register upcoming scheduled activity with the modem controller, which may enable the modem controller to determine whether and/or when Tx activity of the first SIM and Rx activity of the second SIM are overlapping in time. Furthermore, in some aspects, the modem controller may have a capability to detect the antenna(s) that the first SIM and the second SIM are connected to, or the first SIM and the second SIM may indicate the respective connected antennas to the modem controller. In this way, the modem controller may be able to determine whether the first SIM and the second SIM are sharing an antenna switch or whether the first SIM and the second SIM are connected to different antenna switches. Accordingly, the modem controller may stop or suspend Tx activity of the first SIM while the first SIM and the second SIM are sharing an antenna switch and the Tx activity of the first SIM overlaps in time with Rx activity of the second SIM. Furthermore, the modem controller may send a control signal to the first SIM to resume Tx activity when the condition(s) that may cause damage or reliability issues for the power amplifier in the Tx chain associated with the first SIM cease to be satisfied (e.g., the first SIM and the second SIM are no longer sharing an antenna switch, Rx activity of the second SIM has ended, and/or the Tx activity and Rx activity of the respective SIMs are no longer concurrent).

Alternatively, as shown by reference number 640-2, the preventive action may be to deny the Rx activity associated with the second SIM such as in cases where the Tx communication(s) associated with the first SIM have a higher priority than the Rx communication(s) associated with the second SIM. For example, in some cases, the Tx activity on the first SIM may include high-priority control information to be transmitted on an uplink (e.g., medium access control (MAC) uplink control signaling on a physical uplink control channel (PUCCH) and/or radio resource control (RRC) signaling, among other examples). Additionally, or alternatively, the Tx activity on the first SIM may include high-priority traffic, such as emergency services related traffic and/or real-time voice or video traffic associated with a real-time protocol (e.g., a real-time voice or video encoded packet transported by a Real-time Transport Protocol (RTP)/User Datagram Protocol (UDP)/Internet Protocol (IP) packet header and/or a Real-time Transport Control Protocol (RTCP)/UDP/IP packet header). In some aspects, the modem controller may therefore determine the respective priorities of the Tx activity associated with the first SIM and the Rx activity associated with the second SIM, and may determine the appropriate preventive action accordingly.

For example, in cases where the Rx activity of the second SIM has a higher priority over concurrent Tx activity of the first SIM, the preventive action may be to limit the maximum output power from the power amplifier in the Tx chain of the first SIM or to stop or suspend the Tx activity of the first SIM, as described above. Otherwise, in cases where the Tx activity of the first SIM has a higher priority than the Rx activity of the second SIM, the modem controller may send a control signal to the second SIM indicating that the Rx activity is denied (e.g., the second SIM is not allowed to toggle the antenna switch that is shared with the first SIM), and the concurrent Tx activity of the first SIM may be allowed to proceed. For example, in some aspects, the priorities of the first SIM and the second SIM may be expressed as an integer value within a certain range (e.g., from 1 to 10, from 1 to 5, or another suitable range), with the higher value representing a highest priority. Accordingly, in one example based on a priority range from 1 to 10, with 10 having a highest priority, Rx activity with a priority of 8 and Tx activity with a priority of 5 may mean that the Rx activity has a higher priority, whereby the modem controller may either limit the maximum output power from the Tx power amplifier of the first SIM or stop or suspend the Tx activity of the first SIM. Alternatively, if the Rx activity has a priority of 5 and Tx activity with a priority of 8, the Tx activity has a higher priority, whereby the modem controller may deny the Rx activity of the second SIM and allow the Tx activity of the first SIM to proceed. In general, as described above, the SIMS may report the traffic priorities to the modem controller when registering respective Tx/Rx activities, or the SIMS may report traffic types to the modem controller and the modem controller may determine the respective priorities based on the traffic types.

As indicated above, FIGS. 6A-6B are provided as examples. Other examples may differ from what is described with regard to FIGS. 6A-6B.

Figure 7:
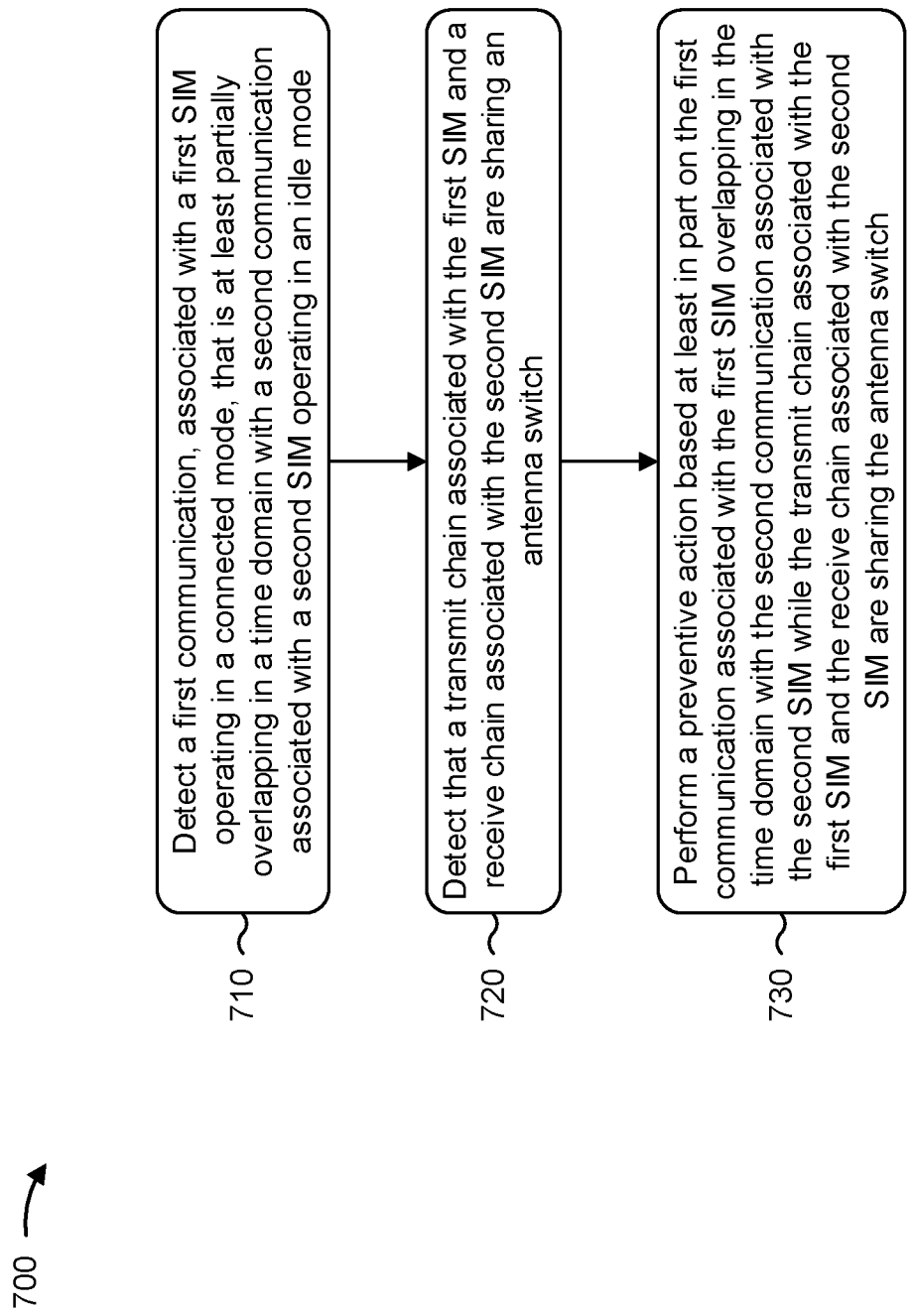
FIG. 7 is a diagram illustrating an example process associated with managing power amplifier reliability for multi-SIM antenna switching concurrency, in accordance with the present disclosure.

FIG. 7 is a diagram illustrating an example process 700 performed, for example, by a UE, in accordance with the present disclosure. Example process 700 is an example where the UE (e.g., UE 120) performs operations associated with techniques for managing power amplifier reliability for multi-SIM antenna switching concurrency.

As shown in FIG. 7, in some aspects, process 700 may include detecting a first communication, associated with a first SIM operating in a connected mode, that is at least partially overlapping in a time domain with a second communication associated with a second SIM operating in an idle mode (block 710). For example, the UE (e.g., using detection component 808, depicted in FIG. 8) may detect a first communication, associated with a first SIM operating in a connected mode, that is at least partially overlapping in a time domain with a second communication associated with a second SIM operating in an idle mode, as described above.

As further shown in FIG. 7, in some aspects, process 700 may include detecting that a transmit chain associated with the first SIM and a receive chain associated with the second SIM are sharing an antenna switch (block 720). For example, the UE (e.g., using detection component 808, depicted in FIG. 8) may detect that a transmit chain associated with the first SIM and a receive chain associated with the second SIM are sharing an antenna switch, as described above.

As further shown in FIG. 7, in some aspects, process 700 may include performing a preventive action based at least in part on the first communication associated with the first SIM overlapping in the time domain with the second communication associated with the second SIM while the transmit chain associated with the first SIM and the receive chain associated with the second SIM are sharing the antenna switch (block 730). For example, the UE (e.g., using control component 810, depicted in FIG. 8) may perform a preventive action based at least in part on the first communication associated with the first SIM overlapping in the time domain with the second communication associated with the second SIM while the transmit chain associated with the first SIM and the receive chain associated with the second SIM are sharing the antenna switch, as described above.

Process 700 may include additional aspects, such as any single aspect or any combination of aspects described below and/or in connection with one or more other processes described elsewhere herein.

In a first aspect, the second communication associated with the second SIM includes activity to prepare or program one or more components in the receive chain associated with the second SIM to demodulate or decode a received signal.

In a second aspect, alone or in combination with the first aspect, the preventive action is to limit an allowable output power from the transmit chain associated with the first SIM to a maximum value that satisfies a ruggedness or reliability parameter associated with a power amplifier in the transmit chain associated with the first SIM.

In a third aspect, alone or in combination with one or more of the first and second aspects, the maximum value for the allowable output power is a minimum of the ruggedness or reliability parameter associated with the power amplifier and one or more additional limits on the allowable output power from the transmit chain associated with the first SIM.

In a fourth aspect, alone or in combination with one or more of the first through third aspects, the preventive action is to stop or suspend transmission activity associated with the first SIM while the first communication associated with the first SIM is overlapping in the time domain with the second communication associated with the second SIM.

In a fifth aspect, alone or in combination with one or more of the first through fourth aspects, process 700 includes resuming the transmission activity associated with the first SIM based at least in part on the first communication associated with the first SIM ceasing to overlap in the time domain with the second communication associated with the second SIM.

In a sixth aspect, alone or in combination with one or more of the first through fifth aspects, the preventive action is to deny the second communication associated with the second SIM that overlaps in the time domain with the first communication associated with the first SIM.

In a seventh aspect, alone or in combination with one or more of the first through sixth aspects, process 700 includes determining a first priority for the first communication associated with the first SIM and a second priority for the second communication associated with the second SIM, and selecting the preventive action based at least in part on the first priority and the second priority.

In an eighth aspect, alone or in combination with one or more of the first through seventh aspects, the preventive action is to limit an allowable output power from the transmit chain associated with the first SIM or to stop or suspend transmission activity associated with the first SIM based at least in part on the second communication associated with the second SIM having a higher priority than the first communication associated with the first SIM.

In a ninth aspect, alone or in combination with one or more of the first through eighth aspects, the preventive action is to deny the second communication associated with the second SIM that overlaps in the time domain with the first communication associated with the first SIM based at least in part on the first communication associated with the first SIM having a higher priority than the second communication associated with the second SIM.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
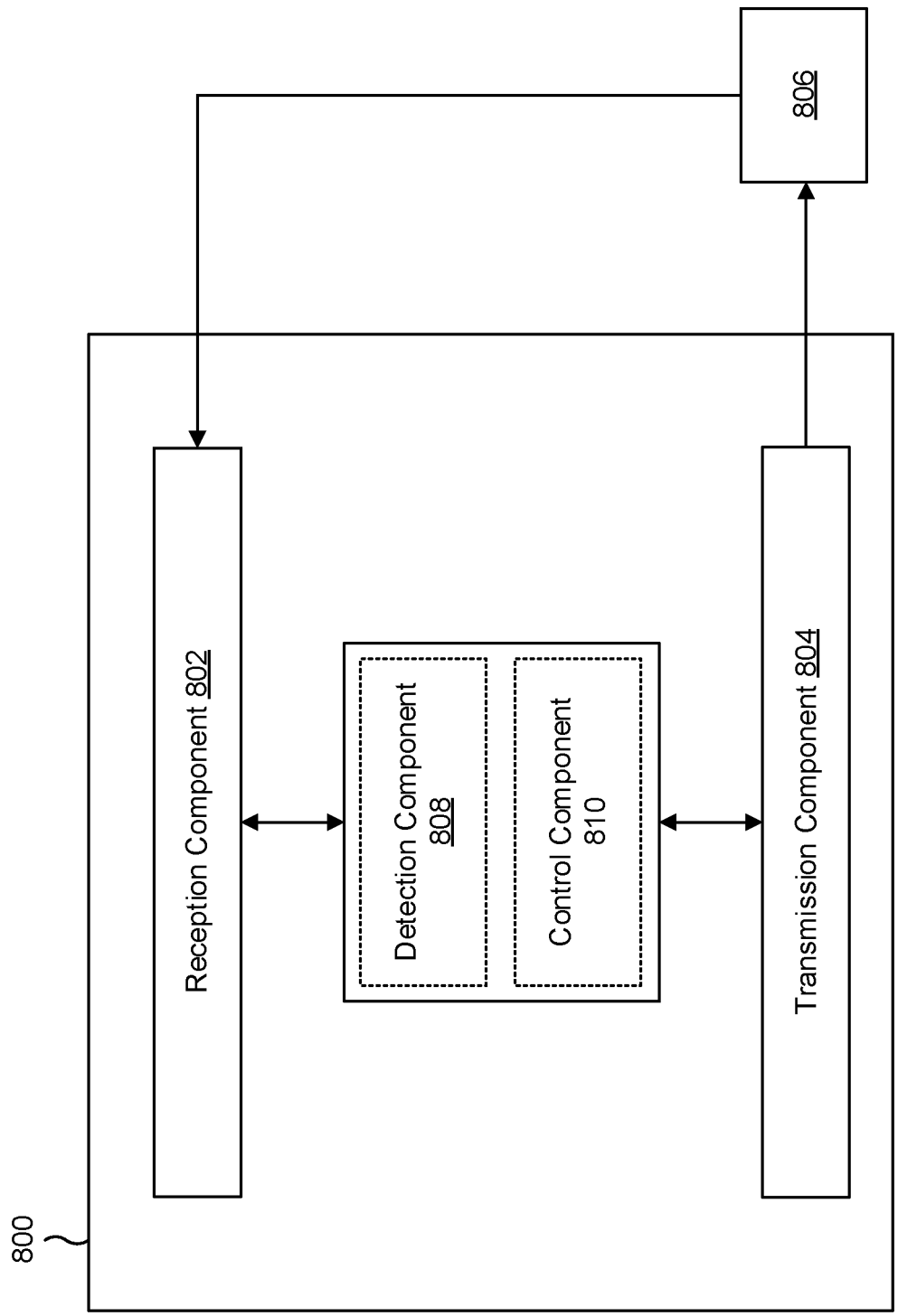
FIG. 8 is a block diagram of an example apparatus for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (e.g., via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a detection component 808 or a control component 810, among other examples.

In some aspects, the apparatus 800 may be configured to perform one or more operations described herein in connection with FIGS. 6A-6B. Additionally, or alternatively, the apparatus 800 may be configured to perform one or more processes described herein, such as process 700 of FIG. 7. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The detection component 808 may detect a first communication, associated with a first SIM operating in a connected mode, that is at least partially overlapping in a time domain with a second communication associated with a second SIM operating in an idle mode. The detection component 808 may detect that a transmit chain associated with the first SIM and a receive chain associated with the second SIM are sharing an antenna switch. The control component 810 may perform a preventive action based at least in part on the first communication associated with the first SIM overlapping in the time domain with the second communication associated with the second SIM while the transmit chain associated with the first SIM and the receive chain associated with the second SIM are sharing the antenna switch.

The control component 810 may resume transmission activity associated with the first SIM based at least in part on the first communication associated with the first SIM ceasing to overlap in the time domain with the second communication associated with the second SIM.

The control component 810 may determine a first priority for the first communication associated with the first SIM and a second priority for the second communication associated with the second SIM. The control component 810 may select the preventive action based at least in part on the first priority and the second priority.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some aspects of the present disclosure:

Aspect 1: A method of wireless communication performed by a UE, comprising: detecting a first communication, associated with a first SIM operating in a connected mode, that is at least partially overlapping in a time domain with a second communication associated with a second SIM operating in an idle mode; detecting that a transmit chain associated with the first SIM and a receive chain associated with the second SIM are sharing an antenna switch; and performing a preventive action based at least in part on the first communication associated with the first SIM overlapping in the time domain with the second communication associated with the second SIM while the transmit chain associated with the first SIM and the receive chain associated with the second SIM are sharing the antenna switch.

Aspect 2: The method of aspect 1, wherein the second communication associated with the second SIM includes activity to prepare or program one or more components in the receive chain associated with the second SIM to demodulate or decode a received signal.

Aspect 3: The method of any of aspects 1-2, wherein the preventive action is to limit an allowable output power from the transmit chain associated with the first SIM to a maximum value that satisfies a ruggedness or reliability parameter associated with a power amplifier in the transmit chain associated with the first SIM.

Aspect 4: The method of aspect 3, wherein the maximum value for the allowable output power is a minimum of the ruggedness or reliability parameter associated with the power amplifier and one or more additional limits on the allowable output power from the transmit chain associated with the first SIM.

Aspect 5: The method of any of aspects 1-2, wherein the preventive action is to stop or suspend transmission activity associated with the first SIM while the first communication associated with the first SIM is overlapping in the time domain with the second communication associated with the second SIM.

Aspect 6: The method of aspect 5, further comprising: resuming the transmission activity associated with the first SIM based at least in part on the first communication associated with the first SIM ceasing to overlap in the time domain with the second communication associated with the second SIM.

Aspect 7: The method of any of aspects 1-2, wherein the preventive action is to deny the second communication associated with the second SIM that overlaps in the time domain with the first communication associated with the first SIM.

Aspect 8: The method of any of aspects 1-7, further comprising: determining a first priority for the first communication associated with the first SIM and a second priority for the second communication associated with the second SIM; and selecting the preventive action based at least in part on the first priority and the second priority.

Aspect 9: The method of aspect 8, wherein the preventive action is to limit an allowable output power from the transmit chain associated with the first SIM or to stop or suspend transmission activity associated with the first SIM based at least in part on the second communication associated with the second SIM having a higher priority than the first communication associated with the first SIM.

Aspect 10: The method of aspect 8, wherein the preventive action is to deny the second communication associated with the second SIM that overlaps in the time domain with the first communication associated with the first SIM based at least in part on the first communication associated with the first SIM having a higher priority than the second communication associated with the second SIM.

Aspect 11: An apparatus for wireless communication at a device, comprising a processor; memory coupled with the processor; and instructions stored in the memory and executable by the processor to cause the apparatus to perform the method of any of aspects 1-10.

Aspect 12: A device for wireless communication, comprising a memory and one or more processors coupled to the memory, the memory and the one or more processors configured to perform the method of any of aspects 1-10.

Aspect 13: An apparatus for wireless communication, comprising at least one means for performing the method of any of aspects 1-10.

Aspect 14: A non-transitory computer-readable medium storing code for wireless communication, the code comprising instructions executable by a processor to perform the method of any of aspects 1-10.

Aspect 15: A non-transitory computer-readable medium storing a set of instructions for wireless communication, the set of instructions comprising one or more instructions that, when executed by one or more processors of a device, cause the device to perform the method of any of aspects 1-10.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    detecting a first communication, associated with a first subscriber identity module (SIM) operating in a connected mode, that is at least partially overlapping in a time domain with a second communication associated with a second SIM operating in an idle mode;
    detecting that a transmit chain associated with the first SIM and a receive chain associated with the second SIM are sharing an antenna switch; and
    performing a preventive action associated with a power amplifier in the transmit chain associated with the first SIM, wherein the performance of the preventive action comprises limiting an allowable output power from the transmit chain associated with the first SIM to a maximum value, the performance of the preventive action being based at least in part on the first communication associated with the first SIM overlapping in the time domain with the second communication associated with the second SIM while the transmit chain associated with the first SIM and the receive chain associated with the second SIM are sharing the antenna switch.

2. The method of claim 1, wherein the second communication associated with the second SIM includes activity to prepare or program one or more components in the receive chain associated with the second SIM to demodulate or decode a received signal.

3. The method of claim 1, wherein the maximum value satisfies a ruggedness or reliability parameter associated with the power amplifier in the transmit chain associated with the first SIM.

4. The method of claim 3, wherein the maximum value for the allowable output power is a minimum of the ruggedness or reliability parameter associated with the power amplifier and one or more additional limits on the allowable output power from the transmit chain associated with the first SIM.

5. The method of claim 1, wherein the performance of the preventive action comprises stopping or suspending transmission activity associated with the first SIM while the first communication associated with the first SIM is overlapping in the time domain with the second communication associated with the second SIM.

6. The method of claim 5, further comprising:
resuming the transmission activity associated with the first SIM based at least in part on the first communication associated with the first SIM ceasing to overlap in the time domain with the second communication associated with the second SIM.

7. The method of claim 1, wherein the performance of the preventive action comprises denying the second communication associated with the second SIM that overlaps in the time domain with the first communication associated with the first SIM.

8. The method of claim 1, further comprising:
determining a first priority for the first communication associated with the first SIM and a second priority for the second communication associated with the second SIM; and
selecting the preventive action based at least in part on the first priority and the second priority.

9. The method of claim 8, wherein the performance of the preventive action comprises stopping or suspending transmission activity associated with the first SIM based at least in part on the second communication associated with the second SIM having a higher priority than the first communication associated with the first SIM.

10. The method of claim 8, wherein the performance of the preventive action comprises denying the second communication associated with the second SIM that overlaps in the time domain with the first communication associated with the first SIM based at least in part on the first communication associated with the first SIM having a higher priority than the second communication associated with the second SIM.

11. A user equipment (UE) for wireless communication, comprising:
one or more memories; and
one or more processors, coupled to the one or more memories, configured to:
detect a first communication, associated with a first subscriber identity module (SIM) operating in a connected mode, that is at least partially overlapping in a time domain with a second communication associated with a second SIM operating in an idle mode;
detect that a transmit chain associated with the first SIM and a receive chain associated with the second SIM are sharing an antenna switch; and
perform a preventive action associated with a power amplifier in the transmit chain associated with the first SIM, wherein, to perform the preventive action, the one or more processors are configured to limit an allowable output power from the transmit chain associated with the first SIM to a maximum value, the performance of the preventive action being based at least in part on the first communication associated with the first SIM overlapping in the time domain with the second communication associated with the second SIM while the transmit chain associated with the first SIM and the receive chain associated with the second SIM are sharing the antenna switch.

12. The UE of claim 11, wherein the second communication associated with the second SIM includes activity to prepare or program one or more components in the receive chain associated with the second SIM to demodulate or decode a received signal.

13. The UE of claim 11, wherein the maximum value satisfies a ruggedness or reliability parameter associated with the power amplifier in the transmit chain associated with the first SIM.

14. The UE of claim 13, wherein the maximum value for the allowable output power is a minimum of the ruggedness or reliability parameter associated with the power amplifier and one or more additional limits on the allowable output power from the transmit chain associated with the first SIM.

15. The UE of claim 11, wherein, to perform the preventive action, the one or more processors are configured to stop or suspend transmission activity associated with the first SIM while the first communication associated with the first SIM is overlapping in the time domain with the second communication associated with the second SIM.

16. The UE of claim 15, wherein the one or more processors are further configured to:
resume the transmission activity associated with the first SIM based at least in part on the first communication associated with the first SIM ceasing to overlap in the time domain with the second communication associated with the second SIM.

17. The UE of claim 11, wherein, to perform the preventive action, the one or more processors are configured to deny the second communication associated with the second SIM that overlaps in the time domain with the first communication associated with the first SIM.

18. The UE of claim 11, wherein the one or more processors are further configured to:
determine a first priority for the first communication associated with the first SIM and a second priority for the second communication associated with the second SIM; and
select the preventive action based at least in part on the first priority and the second priority.

19. The UE of claim 18, wherein, to perform the preventive action, the one or more processors are configured to stop or suspend transmission activity associated with the first SIM based at least in part on the second communication associated with the second SIM having a higher priority than the first communication associated with the first SIM.

20. The UE of claim 18, wherein, to perform the preventive action, the one or more processors are configured to deny the second communication associated with the second SIM that overlaps in the time domain with the first communication associated with the first SIM based at least in part on the first communication associated with the first SIM having a higher priority than the second communication associated with the second SIM.

21. A non-transitory computer-readable medium storing a set of instructions for wireless communication, the set of instructions comprising:
one or more instructions that, when executed by one or more processors of a user equipment (UE), cause the UE to:
detect a first communication, associated with a first subscriber identity module (SIM) operating in a connected mode, that is at least partially overlapping in a time domain with a second communication associated with a second SIM operating in an idle mode;

detect that a transmit chain associated with the first SIM and a receive chain associated with the second SIM are sharing an antenna switch; and perform a preventive action associated with a power amplifier in the transmit chain associated with the first SIM, wherein, to perform the preventive action, the one or more instructions cause the UE to limit an allowable output power from the transmit chain associated with the first SIM to a maximum value, the performance of the preventive action being based at least in part on the first communication associated with the first SIM overlapping in the time domain with the second communication associated with the second SIM while the transmit chain associated with the first SIM and the receive chain associated with the second SIM are sharing the antenna switch.

22. The non-transitory computer-readable medium of claim 21, wherein the maximum value satisfies a ruggedness or reliability parameter associated with the power amplifier in the transmit chain associated with the first SIM.

23. The non-transitory computer-readable medium of claim 21, wherein the one or more instructions further cause the UE to stop or suspend transmission activity associated with the first SIM while the first communication associated with the first SIM is overlapping in the time domain with the second communication associated with the second SIM.

24. The non-transitory computer-readable medium of claim 21, wherein the one or more instructions further cause the UE to deny the second communication associated with the second SIM that overlaps in the time domain with the first communication associated with the first SIM.

25. The non-transitory computer-readable medium of claim 21, wherein the one or more instructions further cause the UE to:
   determine a first priority for the first communication associated with the first SIM and a second priority for the second communication associated with the second SIM; and
   select the preventive action based at least in part on the first priority and the second priority.

26. An apparatus for wireless communication, comprising:
   means for detecting a first communication, associated with a first subscriber identity module (SIM) operating in a connected mode, that is at least partially overlapping in a time domain with a second communication associated with a second SIM operating in an idle mode;
   means for detecting that a transmit chain associated with the first SIM and a receive chain associated with the second SIM are sharing an antenna switch; and
   means for performing a preventive action associated with a power amplifier in the transmit chain associated with the first SIM, wherein the means for performing the preventive action comprise means for limiting an allowable output power from the transmit chain associated with the first SIM to a maximum value, the performance of the preventive action being based at least in part on the first communication associated with the first SIM overlapping in the time domain with the second communication associated with the second SIM while the transmit chain associated with the first SIM and the receive chain associated with the second SIM are sharing the antenna switch.

27. The apparatus of claim 26, wherein the maximum value satisfies a ruggedness or reliability parameter associated with the power amplifier in the transmit chain associated with the first SIM.

28. The apparatus of claim 26, further comprising means for stopping or suspending transmission activity associated with the first SIM while the first communication associated with the first SIM is overlapping in the time domain with the second communication associated with the second SIM.

29. The apparatus of claim 26, further comprising means for denying the second communication associated with the second SIM that overlaps in the time domain with the first communication associated with the first SIM.

30. The apparatus of claim 26, further comprising:
   means for determining a first priority for the first communication associated with the first SIM and a second priority for the second communication associated with the second SIM; and
   means for selecting the preventive action based at least in part on the first priority and the second priority.

* * * * *